(12) United States Patent
Kobayashi

(10) Patent No.: US 11,423,263 B2
(45) Date of Patent: Aug. 23, 2022

(54) COMPARISON METHOD AND COMPARISON APPARATUS

(71) Applicant: FUJITSU LIMITED, Kawasaki (JP)

(72) Inventor: Kenichi Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1183 days.

(21) Appl. No.: 15/940,132

(22) Filed: Mar. 29, 2018

(65) Prior Publication Data
US 2018/0285694 A1 Oct. 4, 2018

(30) Foreign Application Priority Data

Mar. 31, 2017 (JP) .............................. JP2017-071439

(51) Int. Cl.
| | |
|---|---|
| *G06K 9/62* | (2022.01) |
| *G06F 17/18* | (2006.01) |
| *G06N 7/00* | (2006.01) |
| *G06N 20/00* | (2019.01) |
| *G06F 15/76* | (2006.01) |
| *G06N 5/00* | (2006.01) |
| *G06N 20/10* | (2019.01) |
| *G06N 20/20* | (2019.01) |

(52) U.S. Cl.
CPC .......... *G06K 9/6277* (2013.01); *G06F 15/76* (2013.01); *G06F 17/18* (2013.01); *G06K 9/623* (2013.01); *G06K 9/6215* (2013.01); *G06K 9/6256* (2013.01); *G06K 9/6262* (2013.01); *G06K 9/6269* (2013.01); *G06N 5/003* (2013.01); *G06N 7/005* (2013.01); *G06N 20/00* (2019.01); *G06N 20/10* (2019.01); *G06N 20/20* (2019.01)

(58) Field of Classification Search
None
See application file for complete search history.

(56) References Cited

PUBLICATIONS

Cho J, Lee K, Shin E, Choy G, Do S. How much data is needed to train a medical image deep learning system to achieve necessary high accuracy?. arXiv preprint arXiv:1511.06348. Nov. 19, 2015. (Year: 2015).*

(Continued)

*Primary Examiner* — Clifford Hilaire
(74) *Attorney, Agent, or Firm* — Staas & Halsey LLP

(57) ABSTRACT

A processor builds a plurality of learning models using training data of a plurality of first sample sizes according to a first machine learning algorithm, and calculates a plurality of measured prediction performances. The processor calculates a plurality of estimated variances on the basis of relationship information indicating the relationship between expected value and variance with respect to prediction performance and the plurality of measured prediction performances. The processor creates a first prediction performance curve through a regression analysis using the plurality of measured prediction performances and the plurality of estimated variances. The processor calculates a first evaluation value on the basis of the first prediction performance curve and a second sample size. The processor compares the first evaluation value with a second evaluation value calculated based on a second prediction performance curve corresponding to a second machine learning algorithm and the second sample size.

5 Claims, 20 Drawing Sheets

(56) References Cited

PUBLICATIONS

Perlich, Claudia. "Learning Curves in Machine Learning." (2010): 577-580. (Year: 2010).*

Foster Provost et al., "Efficient Progressive Sampling", Proceedings of the 5th International Conference on Knowledge Discovery and Data Mining, Aug. 15-18, 1999, pp. 23-32, Association for Computing Machinery (ACM).

Prasanth Kolachina et al., "Prediction of Learning Curves in Machine Translation", Proceedings of the 50th Annual Meeting of the Association for Computational Linguistics, Jul. 8-14, 2012, pp. 22-30.

Rosa L. Figueroa et al., "Predicting sample size required for classification performance", BMC Medical Informatics and Decision Making, Feb. 15, 2012, vol. 12 No. 8, pp. 1-10.

* cited by examiner

MANAGEMENT TABLE

122a

| ALGORITHM ID | SAMPLE SIZE | IMPROVEMENT RATE | PREDICTION PERFORMANCE | EXECUTION TIME |
|---|---|---|---|---|
| $a_1 = A$ | $k_1 = s_3$ | $r_1 = 0.73$ | $p_{1,1}, p_{1,2}$ | $T_{1,1}, T_{1,2}$ |
| $a_2 = B$ | $k_2 = s_2$ | $r_2 = 1.00$ | $p_{2,1}$ | $T_{2,1}$ |
| $a_3 = C$ | $k_3 = s_2$ | $r_3 = 0.50$ | $p_{3,1}$ | $T_{3,1}$ |
| ... | ... | ... | ... | ... |

FIG. 10

COMPARISON METHOD AND COMPARISON APPARATUS

CROSS-REFERENCE TO RELATED APPLICATION

This application is based upon and claims the benefit of priority of the prior Japanese Patent Application No. 2017-071439, filed on Mar. 31, 2017, the entire contents of which are incorporated herein by reference.

FIELD

The embodiments discussed herein relate to a comparison method and a comparison apparatus.

BACKGROUND

Machine learning is one of the techniques of computer-based data analysis. In the machine learning, training data indicating some known cases is entered to a computer. The computer analyzes the training data and learns a model that generalizes the relationship between a cause (called "explanatory variable" or "independent variable") and a result (called "response variable" or "dependent variable"). Then, the computer predicts a result of an unknown case using the learned model.

In the machine learning, a learned model is preferable to have a high accuracy of prediction, or to have the ability of correctly predicting a result of an unknown case (the ability may be called "prediction performance"). By using training data of larger sample size to learn a model, the learned model will exhibit higher prediction performance. However, if the training data of the larger sample size is used, more time will be taken to learn the model. In view of this, a progressive sampling method has been proposed for efficiently building a model with sufficient prediction performance for practical use.

In the progressive sampling method, a computer first learns a model using training data of small sample size. Then, the computer makes a prediction on test data indicating a known case, which is different from the training data, using the learned model and compares the predicted result with the known result to thereby evaluate the prediction performance of the learned model. If the prediction performance is poor, the computer performs the model learning using training data of larger sample size than the previous learning again. The computer repeats the above processes until the prediction performance reaches a sufficiently high level. This method avoids using training data of excessively large sample size and thus reduces the time taken to learn a model.

In addition, the following method has been proposed: a prediction performance curve representing the relationship between sample size of training data and prediction performance is estimated using observed prediction performances corresponding to training data of small sample sizes, and a prediction performance corresponding to training data of large sample size is calculated from the estimated prediction performance curve. The proposed method assumes that an estimation equation representing the prediction performance curve is a nonlinear function in which the prediction performance increases greatly while the sample size is small and the prediction performance converges to a certain upper limit as the sample size becomes larger. The proposed method carries out a nonlinear regression analysis using observed prediction performances, and determines unknown coefficients used in the estimation equation.

In addition, for estimating a prediction performance curve through the nonlinear regression analysis, there has been proposed a method of giving different weights to a plurality of observed prediction performances. In this proposed method, a low weight is given to an observed prediction performance corresponding to training data of small sample size, and a high weight is given to an observed prediction performance corresponding to training data of large sample size.

Please see, for example, the following documents:

Foster Provost, David Jensen and Tim Oates, "Efficient Progressive Sampling," Proceedings of the 5th International Conference on Knowledge Discovery and Data Mining, pp. 23-32, Association for Computing Machinery (ACM), 1999.

Prasanth Kolachina, Nicola Cancedda, Marc Dymetman and Sriram Venkatapathy, "Prediction of Learning Curves in Machine Translation," Proceedings of the 50th Annual Meeting of the Association for Computational Linguistics, pp. 22-30, 2012.

Rosa L Figueroa, Qing Zeng-Treitler, Sasikiran Kandula and Long H Ngo, "Predicting sample size required for classification performance," BMC Medical Informatics and Decision Making, Vol. 12 No. 8, 2012.

To build a model from training data, there are various machine learning algorithms including regression analysis, support vector machine (SVM), and random forest. Different machine learning algorithms usually build models with different prediction performances. Therefore, it is likely that the prediction performance is improved by using a plurality of machine learning algorithms, rather than just using a single machine learning algorithm.

In machine learning using a plurality of machine learning algorithms, a prediction performance curve is estimated for each machine learning algorithm, the estimated prediction performance curves are used to compare the prediction performance of models among the plurality of machine learning algorithms, and then the machine learning is controlled. For example, it is considered that a machine learning algorithm that has exhibited a high estimated prediction performance at large sample size is preferentially executed. In this connection, for example, the prediction performance curve for each machine learning algorithm is calculated by building a model from training data of some small sample sizes, measuring the prediction performance of the model, and carrying out a regression analysis using some observed prediction performances.

However, the observed prediction performances include errors that indicate deviations from expected values due to influence of randomness in the selection of training data and test data and other reasons. Since different sample sizes of training data cause different influence of randomness, different observed prediction performances include different errors according to the sample sizes. Especially, an observed prediction performance at small sample size may include a large error due to large influence of randomness.

Therefore, if a prediction performance curve is estimated through a normal regression analysis that has the assumption of homoscedasticity, as in the above-mentioned document, "Prediction of Learning Curves in Machine Translation," the accuracy of estimating a prediction performance curve degrades. In addition, it is difficult to directly recognize the amounts of errors included in the observed prediction performances.

In the above-mentioned document, "Predicting sample size required for classification performance," a weight is given to an observed prediction performance, but the amount of an actual error is not reflected on the weight. Therefore, it is difficult to improve the accuracy of estimating a prediction performance curve. Accordingly, the accuracy of comparing the prediction performance among a plurality of machine learning algorithms degrades.

SUMMARY

According to one aspect, there is provided a non-transitory computer-readable storage medium storing a program that causes a computer to perform a process including: building a plurality of learning models using training data of a plurality of first sample sizes according to a first machine learning algorithm and calculating a plurality of measured prediction performances, the training data being extracted from an identical data population, the plurality of measured prediction performances respectively indicating results of measuring prediction performance of the plurality of learning models; calculating a plurality of estimated variances, based on relationship information and the plurality of measured prediction performances, the plurality of estimated variances respectively indicating results of estimating variances of the prediction performance at the plurality of first sample sizes, the relationship information indicating relationship between expected value and variance with respect to the prediction performance; creating a first prediction performance curve through a regression analysis using the plurality of measured prediction performances and the plurality of estimated variances, the first prediction performance curve representing relationship between sample size and the prediction performance and being a curve in which the prediction performance approaches a fixed upper limit of the prediction performance; calculating a first evaluation value of the first machine learning algorithm, based on the first prediction performance curve and a second sample size; and comparing the first evaluation value with a second evaluation value of a second machine learning algorithm, the second evaluation value being calculated based on a second prediction performance curve corresponding to the second machine learning algorithm and the second sample size.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a management table;

DESCRIPTION OF EMBODIMENTS

Figure 1:
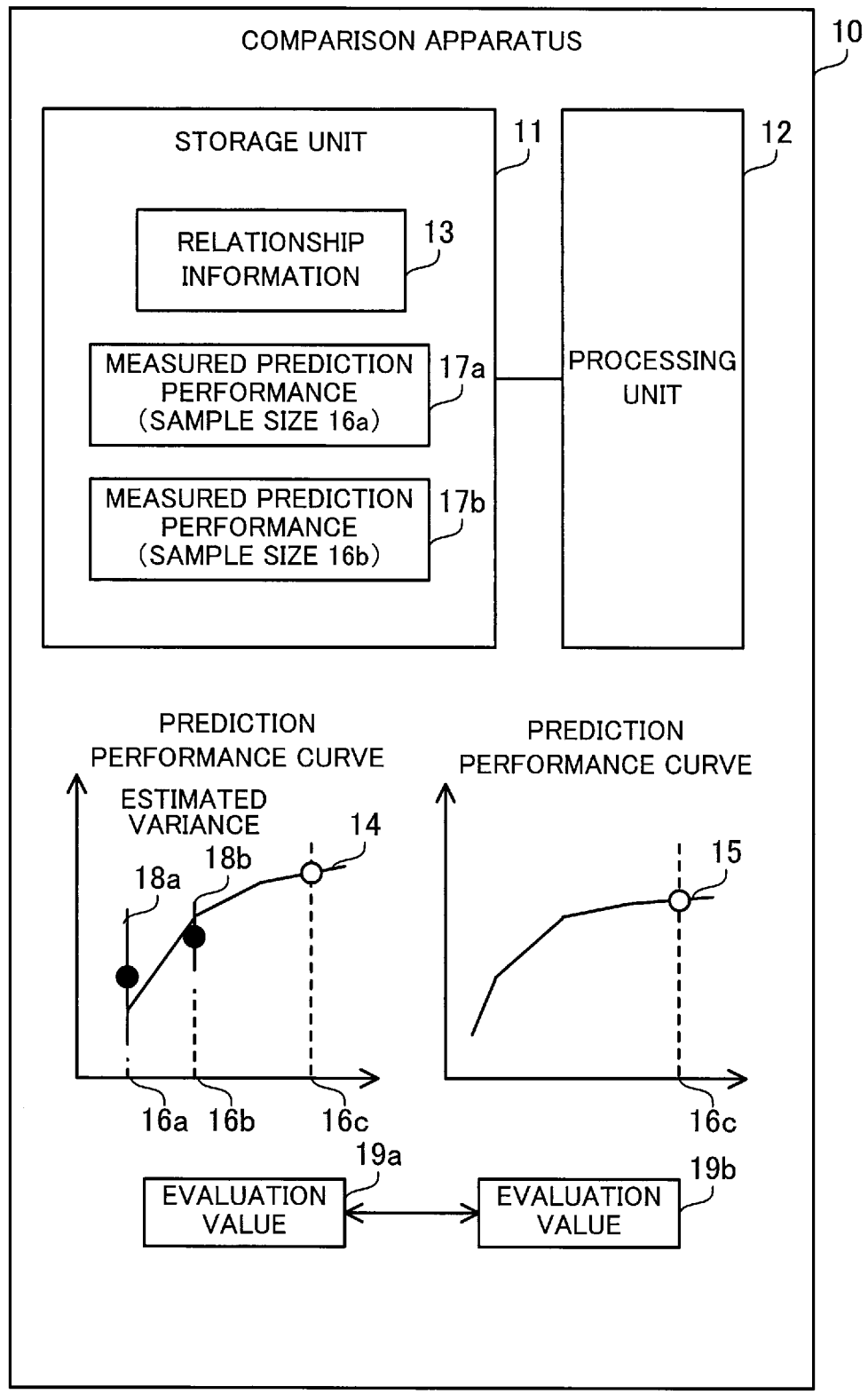
FIG. 1 is a view for explaining a comparison apparatus according to a first embodiment.

Several embodiments will be described below with reference to the accompanying drawings, wherein like reference numerals refer to like elements throughout.

First Embodiment

A first embodiment will be described.

FIG. 1 is a view for explaining a comparison apparatus according to the first embodiment.

The comparison apparatus 10 of the first embodiment estimates prediction performance curves each representing the relationship between sample size of training data used in machine learning and prediction performance of a learning model, and compares the prediction performance among different machine learning algorithms. The comparison apparatus 10 may be a client apparatus, which is operated by a user, a server apparatus, or a computer.

The comparison apparatus 10 includes a storage unit 11 and a processing unit 12. The storage unit 11 may be a volatile semiconductor memory such as a Random Access Memory (RAM), or a nonvolatile storage such as a Hard Disk Drive (HDD) or a flash memory. The processing unit 12 is a processor such as a Central Processing Unit (CPU) or a Digital Signal Processor (DSP), for example. In this connection, the processing unit 12 may include an Application Specific Integrated Circuit (ASIC), Field Programmable Gate Array (FPGA), or other electronic circuits. The processor runs programs stored in a memory (that may be the storage unit 11) such as a RAM. The programs include a comparison program. A set of multiple processors may be called "a multiprocessor," or simply "a processor."

The storage unit 11 stores therein relationship information 13 and measured prediction performances 17a and 17b.

The measured prediction performances 17a and 17b are calculated by the processing unit 12. The processing unit 12 builds different learning models using training data of different sample sizes 16a and 16b that is extracted from the same data population, according to a first machine learning algorithm, and calculates the measured prediction performances 17a and 17b indicating the results of measuring the prediction performances of the different learning models. The measured prediction performance 17a corresponds to the sample size 16a, whereas the measured prediction performance 17b corresponds to the sample size 16b. In this first embodiment, the processing unit 12 calculates two measured prediction performances respectively corresponding to two sample sizes for simple explanation. However, three or more measured prediction performances corresponding to three or more sample sizes may be calculated. Examples of the machine learning algorithm include logistic regression analysis, support vector machine, and random forest. The prediction performance indicates how well results of unknown cases are predicted, and therefore may be called "accuracy." Example indices for representing the prediction performance include accuracy, precision, Mean Squared Error (MSE), and Root Mean Squared Error (RMSE).

The relationship information 13 indicates the prescribed relationship between expected value and variance with respect to prediction performance. The relationship indicated by the relationship information 13 may be an empirical regularity between the expected value and variance with respect to prediction performance. For example, the relationship indicated by the relationship information 13 is represented by a prescribed mathematical expression, for example. The relationship information 13 may indicate the relationship among expected loss EL indicating an expected value of an error rate in prediction made by a learning model, expected bias EB2 indicating a lower limit of the expected loss for the first machine learning algorithm, and variance VL of prediction performance. In addition, the relationship information may indicate that the variance VL of prediction performance is proportional to the sum of the expected loss EL and the expected bias EB2 and is also proportional to the difference between the expected loss EL and the expected bias EB2.

The processing unit 12 calculates estimated variances 18a and 18b, which indicate results of estimating the variance of prediction performance at the sample sizes 16a and 16b, on the basis of the relationship information 13 and the measured prediction performances 17a and 17b. The estimated variance 18a indicates the variance of prediction performance at the sample size 16a, whereas the estimated variance 18b indicates the variance of prediction performance at the sample size 16b. In general, when a smaller sample size is used, a higher variance of prediction performance is obtained.

For example, the processing unit 12 converts the measured prediction performances 17a and 17b into estimated expected losses, and calculates an estimated expected bias for the first machine learning algorithm on the basis of the measured prediction performances 17a and 17b. The method of converting the measured prediction performances 17a and 17b into the estimated expected losses depends on an index used for the prediction performance and an index used for the expected loss. For example, an estimated expected loss corresponding to a measured prediction performance y may be $1-y$, $y$, $y^2$, or another. The estimated expected bias is calculated as a lower limit of the expected loss by, for example, fitting the measured prediction performances 17a and 17b to a curve through trial and error. The processing unit 12 substitutes the plurality of estimated expected losses and the estimated expected bias into the mathematical expression indicated by the relationship information 13 to thereby calculate the estimated variances 18a and 18b.

The processing unit 12 creates a prediction performance curve 14 for the first machine learning algorithm through a nonlinear regression analysis, using the measured prediction performances 17a and 17b and the estimated variances 18a and 18b. The prediction performance curve 14 represents the relationship between sample size and prediction performance, and is a nonlinear regression curve in which the prediction performance approaches a certain upper limit of the prediction performance. At this time, the processing unit 12 may give weights to the measured prediction performances 17a and 17b according to the estimated variances 18a and 18b. A lower weight is preferably given when the estimated variance is higher. For example, the weight is inversely proportional to the estimated variance. A low weight means that a large residual is accepted between an estimated prediction performance and a measured prediction performance on the prediction performance curve 14.

The processing unit 12 calculates an evaluation value 19a of the first machine learning algorithm on the basis of the prediction performance curve 14 and a sample size 16c. The sample size 16c is larger than the sample sizes 16a and 16b for which measured prediction performances have already been obtained, for example. The evaluation value 19a is a value about the result of estimating the prediction performance at the sample size 16c. For example, the processing unit 12 obtains an estimated prediction performance at the sample size 16c from the prediction performance curve 14, and takes the estimated prediction performance or a value obtained by converting the estimated prediction performance, as the evaluation value 19a.

In addition, the processing unit 12 obtains a prediction performance curve 15 for a second machine learning algorithm. The processing unit 12 may create the prediction performance curve 15 in the same way as done for the prediction performance curve 14. The processing unit 12 calculates an evaluation value 19b of the second machine learning algorithm on the basis of the prediction performance curve 15 and the sample size 16c. The evaluation value 19b is a value about the result of estimating the prediction performance at the sample size 16c, as with the evaluation value 19a. For example, the processing unit 12 obtains an estimated prediction performance at the sample size 16c from the prediction performance curve 15, and takes the estimated prediction performance or a value obtained by converting the estimated prediction performance, as the evaluation value 19b.

Then, the processing unit 12 compares the evaluation value 19a with the evaluation value 19b, and controls the execution of the machine learning on the basis of the comparison result (which is higher, the evaluation value 19a or the evaluation value 19b). For example, the processing unit 12 exercises control such that the first machine learning algorithm or the second machine learning algorithm, whichever has a higher evaluation value, is preferentially executed.

As described above, the comparison apparatus of the first embodiment calculates estimated variances each indicating a result of estimating a variance at a sample size, on the basis of the relationship information 13 and the measured prediction performances corresponding to a plurality of sample sizes with respect to a machine learning algorithm. Then, the comparison apparatus 10 creates the prediction performance curve 14 through a regression analysis on the basis of the measured prediction performances and estimated variances at the plurality of sample sizes. Then, the comparison apparatus 10 compares the evaluation value 19a calculated from the prediction performance curve 14 with the evaluation value 19b calculated from the prediction performance curve 15 of another machine learning algorithm.

The above approach makes it possible to improve the accuracy of estimating the prediction performance curve 14, compared with the case where differences (heteroscedasticity) in the variance of prediction performance among sample sizes are not considered. As a result, it is possible to improve the accuracy of comparing the prediction performance among different machine learning algorithms.

Second Embodiment

A second embodiment will now be described.

Figure 2:
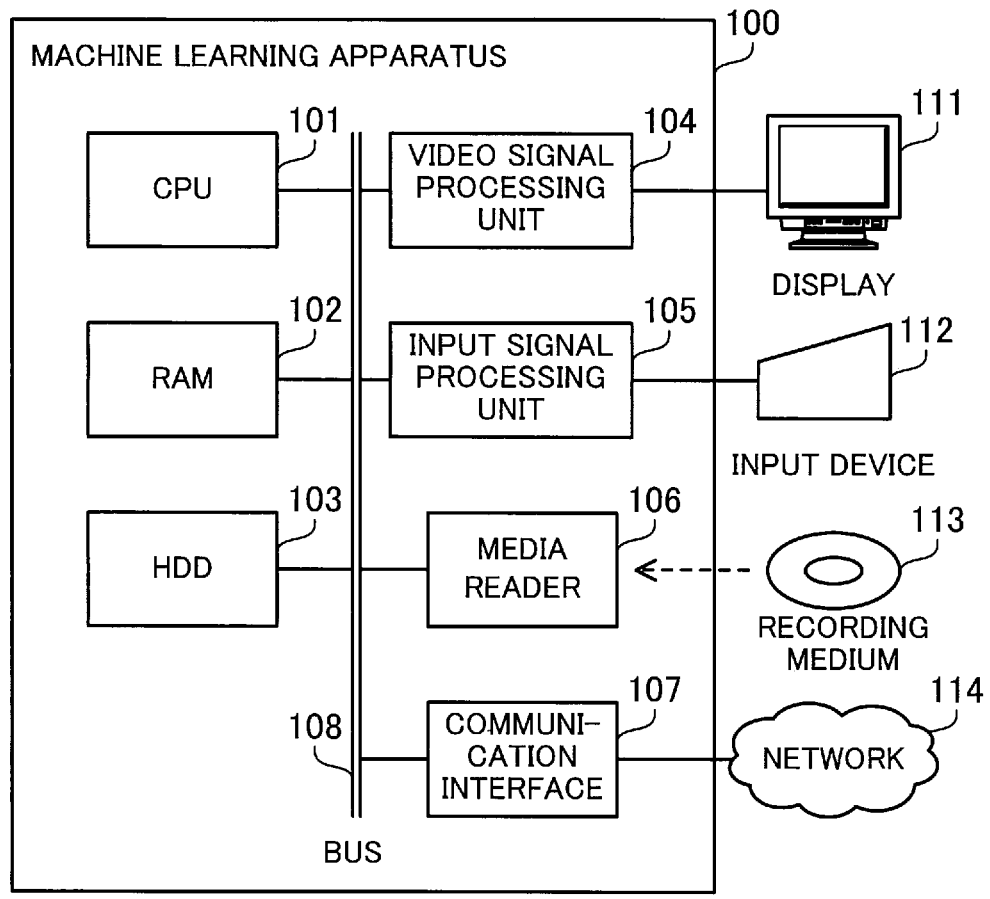
FIG. 2 is a block diagram illustrating an example of a hardware configuration of a machine learning apparatus.

FIG. 2 is a block diagram illustrating an example of a hardware configuration of a machine learning apparatus.

The machine learning apparatus 100 includes a CPU 101, a RAM 102, an HDD 103, a video signal processing unit 104, an input signal processing unit 105, a media reader 106, and a communication interface 107. The CPU 101, the RAM 102, the HDD 103, the video signal processing unit 104, the input signal processing unit 105, the media reader 106, and the communication interface 107 are connected to a bus 108. In this connection, the machine learning apparatus 100 corresponds to the comparison apparatus 10 of the first embodiment. The CPU 101 corresponds to the processing unit 12 of the first embodiment. The RAM 102 or the HDD 103 corresponds to the storage unit 11 of the first embodiment.

The CPU 101 is a processor that includes an arithmetic circuit to execute program instructions. The CPU 101 loads at least part of a program and data from the HDD 103 to the RAM 102 and executes the program. The CPU 101 may include a plurality of processor cores, and the machine learning apparatus 100 may include a plurality of processors. The processing described later may be executed in parallel by using a plurality of processors or processor cores. In addition, a set of processors (multiprocessor) may be referred to as a "processor."

The RAM 102 is a volatile semiconductor memory that temporarily stores therein a program to be executed by the CPU 101 or data to be used by the CPU 101 in processing. The machine learning apparatus 100 may include a different kind of memory than RAM, or a plurality of memories.

The HDD 103 is a non-volatile storage device that stores therein software programs such as an operating system (OS), middleware, and application software, and data. The programs include a comparison program. The machine learning apparatus 100 may include a different kind of storage device such as a flash memory or a Solid State Drive (SSD), or a plurality of non-volatile storage devices.

The video signal processing unit 104 outputs images to a display 111 connected to the machine learning apparatus 100 in accordance with instructions from the CPU 101. Examples of the display 111 include a Cathode Ray Tube (CRT) display, a Liquid Crystal Display (LCD), a Plasma Display Panel (PDP), and an Organic Electro-Luminescence (OEL) display.

The input signal processing unit 105 receives an input signal from an input device 112 connected to the machine learning apparatus 100 and outputs the input signal to the CPU 101. Examples of the input device 112 include pointing devices, such as mouse, touch panel, touch pad, and trackball, keyboards, remote controllers, and button switches. A plurality of kinds of input devices may be connected to the machine learning apparatus 100.

The media reader 106 is a reading device that reads programs and data from a recording medium 113. Examples of the recording medium 113 include magnetic disks such as Flexible Disk (FD) and HDD, optical discs, such as Compact Disc (CD) and Digital Versatile Disc (DVD), Magneto-Optical disks (MO), and semiconductor memories. For example, the media reader 106 stores a program or data read from the recording medium 113 in the RAM 102 or the HDD 103.

The communication interface 107 is connected to a network 114 and communicates with other apparatuses over the network 114. The communication interface 107 may be a wired communication interface that is connected to a switch or another communication device via a cable or may be a wireless communication interface that is connected to a base station via a wireless link.

The following describes the relationship among sample size, prediction performance, and learning time in machine learning, and a progressive sampling method.

In the machine learning of the second embodiment, data including a plurality of unit data indicating known cases is collected in advance. The machine learning apparatus 100 or another information processing apparatus may collect the data from a sensor device or other various kinds of devices over the network 114. The collected data may be data of large size called "big data." Normally, each unit data includes a value of at least one explanatory variable and a value of one response variable. For example, in the machine learning for predicting a commodity demand, result data including causes that affect the product demand, such as temperature and humidity, as the explanatory variables and a product demand as the response variable is collected.

The machine learning apparatus 100 samples some of the unit data from the collected data as training data and learns a model using the training data. The model represents the relationship between the explanatory variables and the response variable, and normally includes at least one explanatory variable, at least one coefficient, and one response variable. For example, models are expressed in the form of mathematical expressions, such as linear equations, second or higher degree polynomials, exponential functions, and logarithmic functions. The form of mathematical expression may be specified by a user before execution of the machine learning. The coefficients are determined on the basis of the training data by the machine learning.

By using the learned model, it is possible to predict a value (result) of the response variable of an unknown case from values (causes) of the explanatory variables of the unknown case. For example, it is possible to predict a product demand in the next term from the weather forecast in the next term. The model outputs a predicted result in the form of a continuous number, such as a probability value between zero and one, or a discrete number, such as binary value like YES and NO.

It is possible to calculate the "prediction performance" of a learned model. The prediction performance is the ability of correctly predicting a result of an unknown case and may be called "accuracy." The machine learning apparatus 100 samples unit data other than the training data from the collected data as test data and calculates the prediction performance using the test data. The size of the test data is about half the size of the training data, for example. The machine learning apparatus 100 inputs the values of the explanatory variables included in the test data to the model, and compares the value (i.e., predicted value) of the response variable output from the model with the value (i.e., actual value) of the response variable included in the test data. Hereinafter, to evaluate the prediction performance of a learned model may be referred to as "validation."

Indices for representing the prediction performance include accuracy, precision, MSE, RMSE, and others. For example, it is assumed that a result is represented in binary form, YES and NO. It is also assumed that, among the cases represented by $N_1$ pieces of test data, the number of cases in which the predicted value is YES and the actual value is YES is Tp, the number of cases in which the predicted value is YES and the actual value is NO is Fp, the number of cases in which the predicted value is NO and the actual value is YES is Fn, and the number of cases in which the predicted value is NO and the actual value is NO is Tn. The accuracy means the percentage of correct predictions and is calculated as $(Tp+Tn)/N_1$. The precision means the probability of correctly predicting "YES" and is calculated as $Tp/(Tp+Fp)$. The MSE is calculated as $sum(y-\hat{y})^2/N_1$ and the RMSE is calculated as $(sum(y-\hat{y})^2/N_1)^{1/2}$, where y and $\hat{y}$ denote the actual value and the predicted value of an individual case, respectively. Here, the following equation, $MSE=RMSE^2$, is satisfied.

In the case of using a single machine learning algorithm, a higher prediction performance is obtained by increasing the number of pieces of unit data sampled as the training data (i.e., by using a larger sample size).

Figure 3:
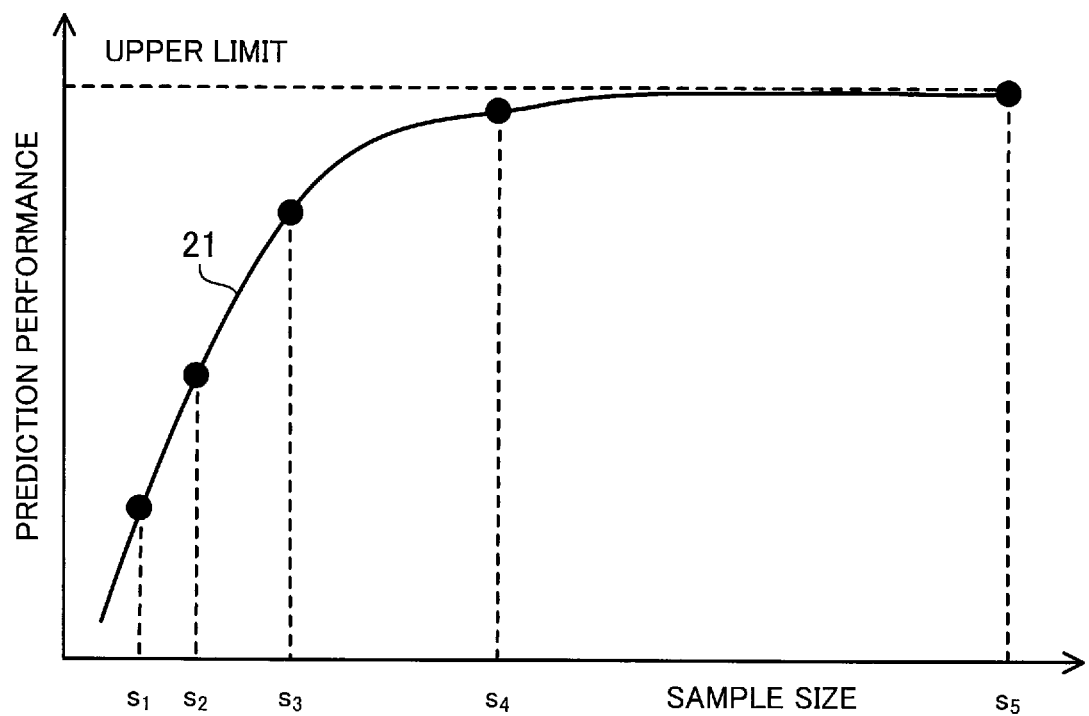
FIG. 3 is a graph representing an example of the relationship between sample size and prediction performance.

FIG. 3 is a graph representing an example of the relationship between sample size and prediction performance.

A curve 21 represents the relationship between prediction performance of a model and sample size. Sample sizes $s_1$, $s_2$, $s_3$, $s_4$, and $s_5$ satisfy the relationship of $s_1<s_2<s_3<s_4<s_5$. For example, $s_2$ is twice or four times $s_1$, and $s_3$ is twice or four times $s_2$. In addition, $s_4$ is twice or four times $s_3$, and $s_5$ is twice or four times $s_4$.

As seen in the curve 21, there are the following tendencies: the prediction performance at the sample size $s_2$ is higher than that at the sample size $s_1$, the prediction performance at the sample size $s_3$ is higher than that at the sample size $s_2$, the prediction performance at the sample size $s_4$ is higher than that at the sample size $s_3$, the prediction performance at the sample size $s_5$ is higher than that at the sample size $s_4$. That is to say, the larger the sample size, the higher the prediction performance. While the prediction performance is low, the prediction performance greatly increases as the sample size increases. However, there is an upper limit for the prediction performance, and as the prediction performance comes closer to the upper limit, the ratio of a prediction performance increase to a sample size increase gradually decreases.

In addition, as the sample size increases, the learning time needed for the machine learning lengthens. If an excessively large sample size is used, the machine learning will be ineffective in terms of the learning time. In the case of the example illustrated in FIG. 3, when the sample size $s_4$ is used, the prediction performance close to the upper limit may be achieved within a short time. However, when the sample size $s_3$ is used, the prediction performance may be insufficient. When the sample size $s_5$ is used, the prediction performance is close to the upper limit, but the prediction performance increase per unit learning time is small, and thus the machine learning is ineffective.

Such relationship between sample size and prediction performance varies according to the nature of data (i.e., the kind of data) used, even when the same machine learning algorithm is used. Thus, it is difficult to previously estimate the minimum sample size with which an upper-limit prediction performance or a nearly upper-limit prediction performance is achieved, before performing the machine learning. In view of this, a machine learning method called a progressive sampling method has been proposed. For example, the above-mentioned document, "Efficient Progressive Sampling," discusses the progressive sampling method.

In the progressive sampling method, a small sample size is used at first, and the sample size is increased stepwise. Machine learning is repeatedly performed until the prediction performance satisfies a prescribed condition. For example, the machine learning apparatus 100 performs the machine learning with the sample size $s_1$ and evaluates the prediction performance of a learned model. If the prediction performance is insufficient, the machine learning apparatus 100 performs the machine learning with the sample size $s_2$ and evaluates the prediction performance. At this time, the training data of the sample size $s_2$ may partially or entirely include the training data of the sample size $s_1$ (the previously used training data). Similarly, the machine learning apparatus 100 performs the machine learning with the sample sizes $s_3$ and evaluates the prediction performance, and performs the machine learning with the sample size $s_4$ and evaluates the prediction performance. If it is determined that the prediction performance at the sample size $s_4$ is sufficient, the machine learning apparatus 100 stops the machine learning and uses the model learned at the sample size $s_4$.

As described above, in the progressive sampling method, every time a single sample size (a single learning step) is processed, a model is learned and the prediction performance thereof is evaluated. Examples of a procedure (a validation method) in each learning step include cross validation and random sub-sampling validation.

In the cross validation, the machine learning apparatus 100 divides sampled data into K blocks (K is an integer of two or greater), and uses (K−1) blocks as training data and one block as test data. The machine learning apparatus 100 repeatedly performs model learning and prediction performance evaluation K times while changing a block used as the test data. As a result of a single learning step, for example, the machine learning apparatus 100 outputs a model with the highest prediction performance among the K models and the average value of the K prediction performances. The cross validation is able to evaluate the prediction performance using a limited amount of data.

In the random sub-sampling validation, the machine learning apparatus 100 randomly samples training data and test data from a data population, learns a model using the training data, and calculates the prediction performance of the model using the test data. The machine learning apparatus 100 repeats the sampling, the model learning, and the prediction performance evaluation K times.

Random sampling without replacement is employed for each sampling. More specifically, in each sampling, the same unit data is not included in training data redundantly, and the same unit data is not included in test data redundantly. In addition, in each sampling, the same unit data is not included in the training data and the test data redundantly. However, in the K executions of the sampling, the same unit data may be selected. As a result of a single learning step, for example, a model with the highest prediction performance among the K models and the average value of the K prediction performances are output.

By the way, there are various procedures (machine learning algorithms) for learning a model from training data. The machine learning apparatus 100 is able to use a plurality of machine learning algorithms. The machine learning apparatus 100 may use several tens to several hundreds of machine learning algorithms. Examples of the machine learning algorithms include logistic regression analysis, support vector machine, and random forest.

The logistic regression analysis is a regression analysis in which values of a response variable y and explanatory variables $x_1, x_2, \ldots, x_k$ are fitted to an S-shaped curve. The response variable y and the explanatory variables $x_1, x_2, \ldots, x_k$ are assumed to satisfy the following relationship, $\log(y/(1-y)) = a_1 x_1 + a_2 x_2 + \ldots + a_k x_k + b$, where $a_1, a_2, \ldots, a_k$, and b are coefficients that are determined through a regression analysis.

The support vector machine is a machine learning algorithm that calculates a boundary plane that divides a collection of unit data placed in a space into two classes in the most distinct manner. The boundary plane is calculated such that its distance (margin) from each class may be maximized.

The random forest is a machine learning algorithm that builds a model for appropriately classifying a plurality of unit data. The random forest randomly samples unit data from a data population. Some of explanatory variables are randomly selected, and the sampled unit data is classified according to the values of the selected explanatory variables. By repeating the selection of explanatory variables and the classification of the unit data, a hierarchical decision tree is generated based on the values of the plurality of explanatory variables. By repeating the sampling of unit data and the generation of a decision tree, a plurality of decision trees is obtained. These decision trees are combined into a final model for classifying the unit data.

Note that a machine learning algorithm may have at least one hyperparameter to manage its own behavior. Unlike the coefficients (parameters) included in models, hyperparameter values are not determined by machine learning, but are given before execution of the machine learning. Examples of the hyperparameters include the number of decision trees to be generated in the random forest, the accuracy of fitting in the regression analysis, and the degree of a polynomial included in a model. The hyperparameter values may be fixed or specified by a user. The prediction performance of a model built varies according to the hyperparameter values. Even with the same machine learning algorithm and the same sample size, different hyperparameter values result in obtaining different prediction performances of a model.

In the second embodiment, in the case of using the same kind of machine learning algorithm with different hyperparameter values, the results may be treated as the results obtained according to different machine learning algorithms. A combination of a kind of machine learning algorithm and hyperparameter values may be called "configuration." That is to say, the machine learning apparatus 100 may treat different configurations as different machine learning algorithms.

Figure 4:
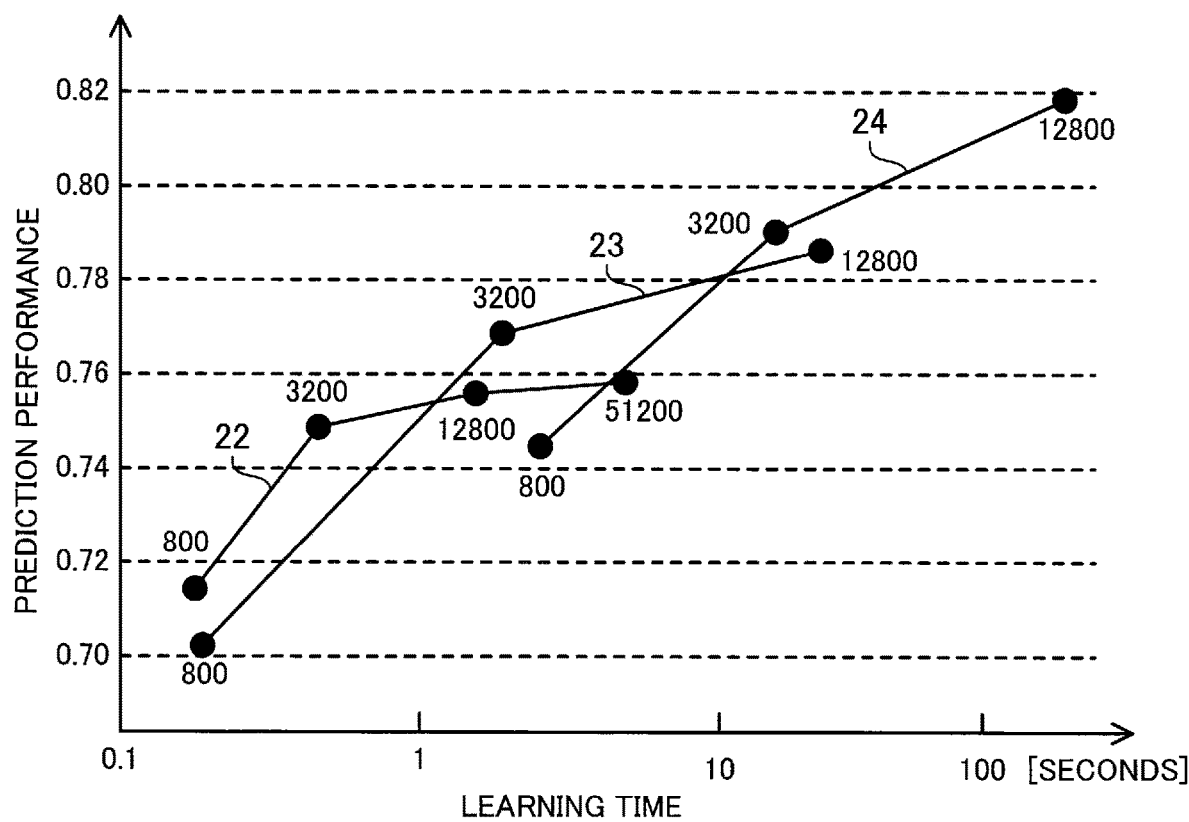
FIG. 4 is a graph representing an example of the relationship between learning time and prediction performance.

FIG. 4 is a graph representing an example of the relationship between learning time and prediction performance.

Curves 22 to 24 represent the relationship between learning time and prediction performance that are measured using a well-known dataset (CoverType). In this example, an accuracy index is used for the prediction performance. The curve 22 represents the relationship between learning time and prediction performance in the case where the logistic regression analysis is used as a machine learning algorithm. The curve 23 represents the relationship between learning time and prediction performance in the case where the support vector machine is used as a machine learning algorithm. The curve 24 represents the relationship between learning time and prediction performance in the case where the random forest is used as a machine learning algorithm. The horizontal axis in FIG. 4 represents learning time on a logarithmic scale.

As seen from the curve 22 that is obtained with the logistic regression analysis, when the sample size is 800, the prediction performance is about 0.71, and the learning time is about 0.2 seconds. When the sample size is 3200, the prediction performance is about 0.75, and the learning time is about 0.5 seconds. When the sample size is 12800, the prediction performance is about 0.755, and the learning time is 1.5 seconds. When the sample size is 51200, the prediction performance is about 0.76, and the learning time is about 6 seconds.

As seen from the curve 23 that is obtained with the support vector machine, when the sample size is 800, the prediction performance is about 0.70, and the learning time is about 0.2 seconds. When the sample size is 3200, the prediction performance is about 0.77, and the learning time is about 2 seconds. When the sample size is 12800, the prediction performance is about 0.785, and the learning time is about 20 seconds.

As seen from the curve 24 that is obtained with the random forest, when the sample size is 800, the prediction performance is about 0.74, and the learning time is about 2.5 seconds. When the sample size is 3200, the prediction performance is about 0.79, and the learning time is about 15 seconds. When the sample size is 12800, the prediction performance is about 0.82, and the learning time is about 200 seconds.

As is clear from the above, with respect to the above dataset, the logistic regression analysis has short learning time and low prediction performance as a whole. The support vector machine has longer learning time and higher prediction performance than the logistic regression analysis, as a whole. The random forest has longer learning time and higher prediction performance than the support vector machine, as a whole. However, in the example of FIG. 4, when the sample size is small, the support vector machine has lower prediction performance than the logistic regression analysis. That is, in the progressive sampling method, different machine learning algorithms produce different rising curves of prediction performance at the initial stage.

In addition, as described earlier, the upper limit and the rising curve of prediction performance of an individual machine learning algorithm also depend on the nature of data used. Thus, it is difficult to previously identify a machine learning algorithm that has a highest upper limit of prediction performance or a machine learning algorithm that achieves prediction performance close to an upper limit within a shortest time, from a plurality of machine learning algorithms. Therefore, the machine learning apparatus 100 uses a plurality of machine learning algorithms as described below to efficiently obtain a model with high prediction performance.

Figure 5:
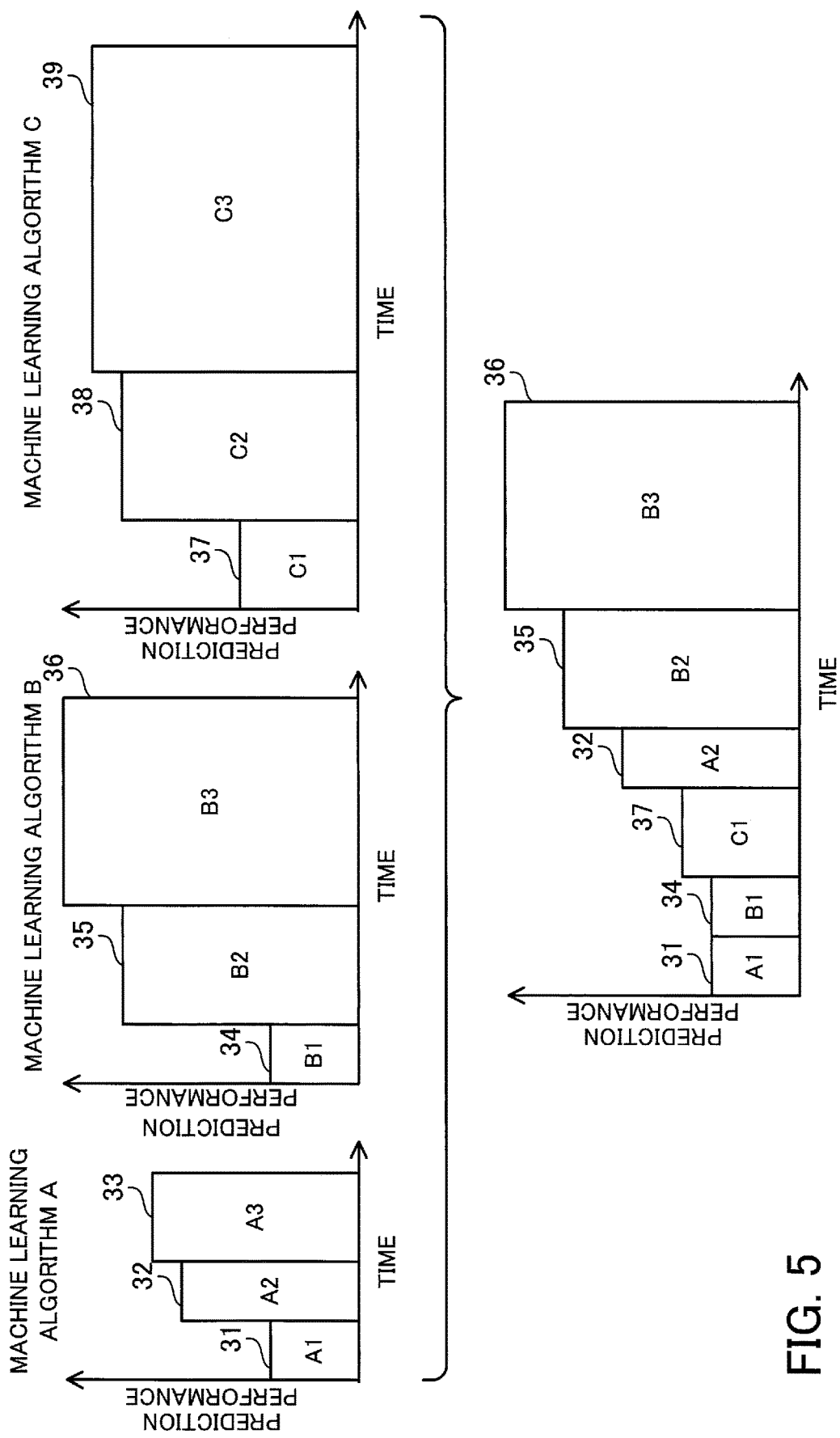
FIG. 5 illustrates an example of how a plurality of machine learning algorithms are used.

FIG. 5 illustrates an example of how a plurality of machine learning algorithms are used.

For simple explanation, the following description describes the case where three machine learning algorithms A, B, and C are used. When the progressive sampling method is executed using only the machine learning algorithm A, learning steps 31, 32 and 33 (A1, A2, and A3) are executed in this order. When the progressive sampling method is executed using only the machine learning algorithm B, learning steps 34, 35, and 36 (B1, B2, and B3) are executed in this order. When the progressive sampling method is executed using only the machine learning algorithm C, learning steps 37, 38, and (C1, C2, and C3) are executed in this order. In this example, it is assumed that a stopping condition is satisfied when the execution of the learning step 33, 36, or 39 is completed.

The same sample size is used in the learning steps 31, 34, and 37. For example, 10,000 pieces of unit data are used in the learning steps 31, 34, and 37. The same sample size is used in the learning steps 32, 35, and 38, and the sample size used in the learning steps 32, 35, and 38 is about twice or four times the sample size used in the learning steps 31, 34, and 37. For example, 40,000 pieces of unit data are used in the learning steps 32, 35, and 38. The same sample size is used in the learning steps 33, 36, and 39, and the sample size used in the learning steps 33, 36, and 39 is about twice or four times the sample size used in the learning steps 32, 35, and 38. For example, 160,000 pieces of unit data are used in the learning steps 33, 36, and 39.

The machine learning apparatus 100 estimates an improvement rate of prediction performance with respect to each machine learning algorithm, which would be obtained when a learning step is executed with the next larger sample size, and selects and executes a machine learning algorithm that has the highest improvement rate. Every time the machine learning apparatus 100 advances the learning step by one, it revises the estimated improvement rates. Thus, while learning steps are executed according to a plurality of machine learning algorithms at first, the machine learning algorithms executed are gradually limited.

An estimated improvement rate is calculated by dividing an estimated performance improvement amount by an estimated execution time. The estimated performance improvement amount is the difference between the estimated prediction performance in the next learning step and the highest prediction performance that has been achieved so far by a plurality of machine learning algorithms (the highest prediction performance may hereinafter be referred to as an achieved prediction performance). The prediction performance in the next learning step is estimated based on past prediction performances of the same machine learning algorithm and the sample size used in the next learning step. The estimated execution time indicates a time estimated to execute the next learning step and is estimated based on past execution times of the same machine learning algorithm and the sample size used in the next learning step.

The machine learning apparatus 100 executes the respective learning steps 31, 34, and 37 of the machine learning algorithms A, B, and C. The machine learning apparatus 100 estimates the improvement rates of the machine learning algorithms A, B, and C on the basis of the execution results of the learning steps 31, 34, and 37, respectively. Assuming that the machine learning apparatus 100 has estimated the improvement rates of the machine learning algorithms A, B, and C to be 2.5, 2.0, and 1.0, respectively, the machine learning apparatus 100 selects the machine learning algorithm A with the highest improvement rate and then executes the learning step 32.

After executing the learning step 32, the machine learning apparatus 100 updates the improvement rates of the machine learning algorithms A, B, and C. It is assumed that the machine learning apparatus 100 has estimated the improvement rates of the machine learning algorithms A, B, and C to be 0.73, 1.0, and 0.5, respectively. Since the achieved prediction performance has been increased by the learning step 32, the improvement rates of the machine learning algorithms B and C have been decreased. The machine learning apparatus 100 selects the machine learning algorithm B with the highest improvement rate and executes the learning step 35.

After executing the learning step 35, the machine learning apparatus 100 updates the improvement rates of the machine learning algorithms A, B, and C. It is assumed that the machine learning apparatus 100 has estimated the improvement rates of the machine learning algorithms A, B, and C to be 0.0, 0.8, and 0.0, respectively. The machine learning apparatus 100 selects the machine learning algorithm B with the highest improvement rate and executes the learning step 36. If the machine learning apparatus 100 determines that the prediction performance has sufficiently been increased by the learning step 36, the machine learning apparatus 100 ends the machine learning. In this case, the machine learning apparatus 100 does not execute the learning step 33 according to the machine learning algorithm A or the learning steps 38 and 39 according to the machine learning algorithm C.

It is preferable that, when the prediction performance in the next learning step is estimated, statistical errors be taken into consideration so as to reduce the risk of eliminating, at an early stage, a machine learning algorithm that would build a model with an increased prediction performance in the future. For example, the machine learning apparatus 100 calculates an expected value of prediction performance and a 95% prediction interval thereof through a regression analysis, and uses the upper confidence bound (UCB) of the 95% prediction interval as the estimated prediction performance to be used in calculation of the improvement rate. The 95% prediction interval indicates a variation of measured prediction performances, and is an interval in which a newly measured prediction performance falls with a probability of 95%. That is, a value larger than a statistically expected value by a width based on a statistical error is used.

Instead of using the UCB, the machine learning apparatus 100 may integrate a distribution of estimated prediction performance to calculate a probability (probability of improvement (PI)) indicating the likeliness that the prediction performance will exceed an achieved prediction performance. Alternatively, the machine learning apparatus 100 may integrate a distribution of estimated prediction performance to calculate an expected improvement (EI) that estimates a prediction performance exceeding the achieved prediction performance.

As described above, since the machine learning apparatus 100 does not execute learning steps that do not contribute to an improvement in the prediction performance, the overall learning time is reduced. In addition, a learning step using a machine learning algorithm with the maximum performance improvement amount per unit time is preferentially executed. Thus, even when the learning time is limited and the machine learning is stopped before its completion, a model obtained when the machine learning is stopped is the best model obtained within the time limit. In addition, learning steps that contribute even just a little to an improvement in the prediction performance have a chance of being executed although their execution may be deferred. Thus, the risk of eliminating a machine learning algorithm that would exhibit a high upper limit of the prediction performance is reduced.

The following describes how to estimate prediction performance.

Figure 6:
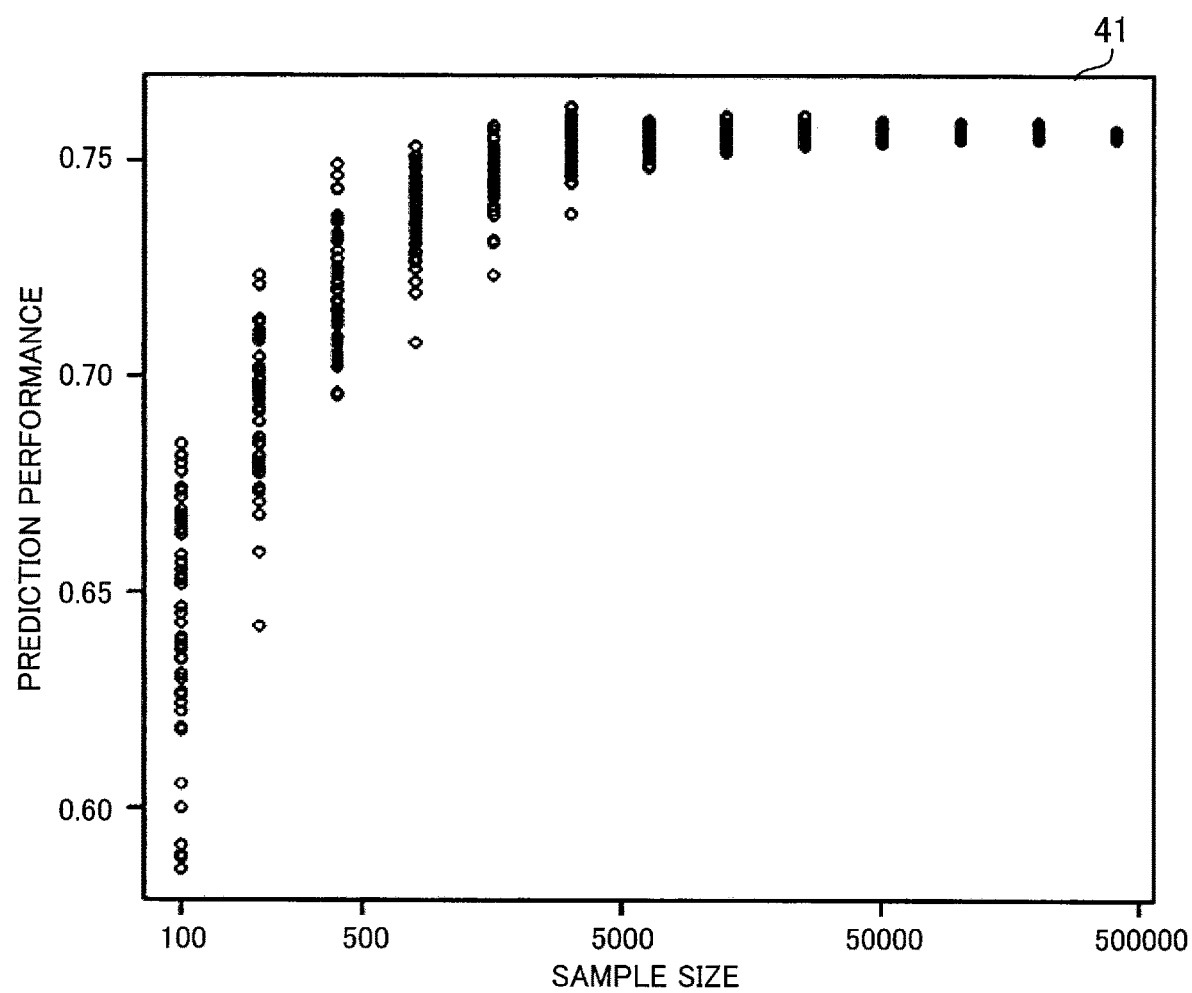
FIG. 6 is a graph representing an example of a distribution of prediction performance.

FIG. 6 is a graph representing an example of a distribution of prediction performance.

An observed prediction performance at a certain sample size has a risk of deviating from an expected value that is determined based on a machine learning algorithm and the nature of a data population. That is, even when the same data population is used, observed prediction performances vary according to randomness of selections of training data and test data and other reasons. The following tendency is seen: the variation (variance, standard deviation, or another) of prediction performance becomes higher as the sample size decreases, and the variation becomes lower as the sample size increases.

The graph 41 represents the relationship between sample size and prediction performance. Here, a learning step is executed 50 times per sample size, using the same learning machine learning algorithm and the same data population. The graph 41 is obtained by plotting 50 observed prediction performances per sample size. In this connection, for this graph 41, an accuracy index is used for the prediction performance. A higher value of the accuracy index means a higher prediction performance.

In this example, as seen from the graph 41, the observed prediction performances have a large range of about 0.58 to 0.68 at a sample size of 100. At a sample size of 500, the observed prediction performances have a range of about 0.69 to 0.75, which is smaller than that obtained at the sample size of 100. The range of observed prediction performances becomes smaller as the sample size increases. When the sample size is sufficiently large, the observed prediction performances converge to about 0.76.

As described earlier, the machine learning apparatus 100 estimates prediction performance that is achieved by executing the next learning step, for each machine learning algorithm. To this end, the machine learning apparatus 100 estimates a prediction performance curve on the basis of previously observed prediction performances. However, the observed prediction performances (especially, observed prediction performances at small sample sizes) may deviate from their expected values. In addition, in the graph 41, the learning step is executed 50 times per sample size. However, it is preferable that the learning step be executed once or several times because of time restriction. Therefore, there is a problem with an accuracy of the estimated prediction performance curve.

Figure 7:
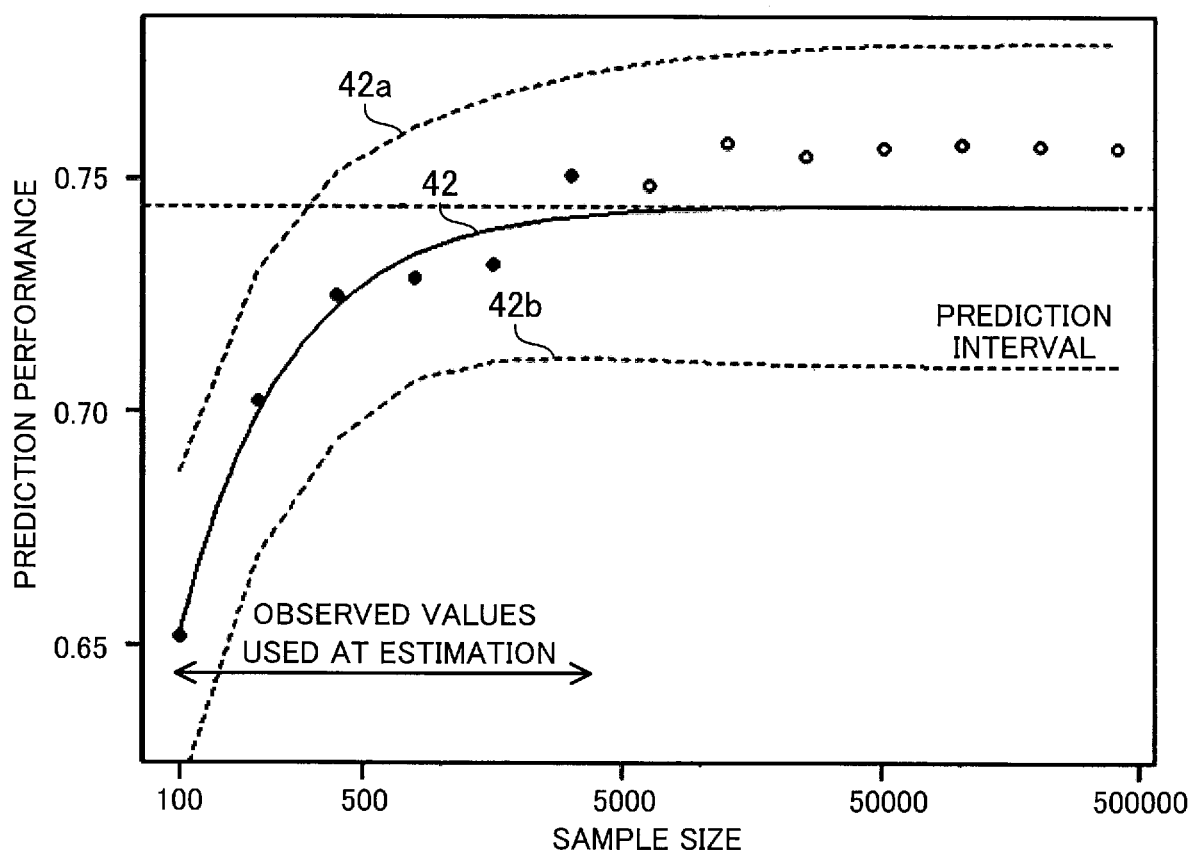
FIG. 7 is a graph representing an example of how to estimate a prediction performance curve.

FIG. 7 is a graph representing an example of how to estimate a prediction performance curve.

In this example, learning steps are executed on six smallest sample sizes among a plurality of sample sizes to obtain observed prediction performances, and then a prediction performance curve is estimated using the six observed prediction performances. Then, learning steps are executed on the remaining sample sizes, and obtained observed prediction performances are compared with the estimated prediction performance curve.

A curve 42 is a prediction performance curve calculated through a nonlinear regression analysis by directly fitting the observed prediction performances to a nonlinear function. In this example, the fourth and fifth observed values are smaller than their corresponding expected values. Therefore, in the curve 42, the upper limit of the prediction performance is underestimated due to the influence of the fourth and fifth observed values. As a result, with respect to the seventh and subsequent sample sizes, the estimated prediction performances indicated by the curve 42 are greatly lower than their corresponding observed values.

A curve 42a represents an upper limit of a prediction interval for the curve 42. A curve 42b represents a lower limit of the prediction interval for the curve 42. The prediction interval is a range into which 95% of observed values repeatedly obtained under the same conditions are expected to fall. The prediction interval is calculated together with the curve 42 through the regression analysis. As seen from the curves 42a and 42b, a significantly large prediction interval is obtained by directly fitting the observed prediction performances to the nonlinear function. Therefore, it is difficult to accurately evaluate the risk of a prediction performance deviating from an estimated value.

For this reason, the simple nonlinear regression analysis has a risk that the accuracy of estimation based on a calculated prediction performance curve is not high. This is partly because a variation of prediction performance varies with the sample size, that is, homoscedasticity is not satisfied. Homoscedasticity is a nature of statistics, in which differences (residuals) between observed value and estimated value of a response variable have the same variance for all values of an explanatory variable included in an estimation equation. In general, the regression analysis assumes homoscedasticity being satisfied. However, as seen in the graph 41, the sample sizes and the prediction performances do not satisfy homoscedasticity. Therefore, it is not easy to estimate a prediction performance curve with high accuracy through the regression analysis using the sample size as an explanatory variable and the prediction performance as a response variable.

In view of this, the machine learning apparatus 100 estimates a prediction performance curve in the following manner.

First, the concept of bias-variance decomposition will be described. The bias-variance decomposition is sometimes used to evaluate the quality of a single machine learning algorithm or the quality of a hyperparameter to be applied to a machine learning algorithm. The bias-variance decomposition uses three indices: loss, bias, and variance. The relationship of "loss equals square of bias plus variance" is satisfied.

The loss is an index that indicates at what degree a model built by machine learning makes an incorrect prediction. Examples of the loss include 0-1 loss and squared loss. In the 0-1 loss, a loss is calculated by giving a value of zero if a prediction is correct and a value of one if a prediction is incorrect. An expected value in the 0-1 loss indicates a probability of a prediction being incorrect. In the 0-1 loss, the fewer the number of predictions being incorrect, the smaller the expected value to be obtained. The greater the number of predictions being incorrect, the larger the expected value to be obtained. The squared loss is the square of the difference (prediction error) between a predicted value and a true value. The smaller the prediction error, the smaller the squared loss. The larger the prediction error, the larger the squared loss. Expected loss (an expected value of loss) and prediction performance are converted between each other. In the case where the accuracy index is used for the prediction performance and the 0-1 loss is used as the loss, "expected loss equals one minus prediction performance." In the case where the MSE index is used for the prediction performance and the squared loss is used as the loss, "expected loss equals MSE." In the case where the RMSE index is used for the prediction performance and the squared loss is used as the loss, "expected loss equals square of RMSE."

The bias is an index that indicates how much a predicted value obtained from a model built by machine learning deviates from a true value. A model with a small bias is considered as a model with high accuracy. The variance is an index that indicates how much predicted values obtained from a model built by machine learning vary. A model with a small variance is considered as a model with high accuracy. In this connection, the bias and the variance normally have trade-off relationship.

With respect to a model with low complexity (may be considered as a model with low expression ability), such as a small-degree polynomial, it is difficult to output predicted values close to corresponding true values for all of a plurality of sample cases even if the coefficients of the model are adjusted in any ways. That is to say, the model with low complexity is not able to represent a complicated case. Therefore, the model with low complexity tends to have a large bias. However, a model with high complexity (may be considered as a model with high expression ability), such as a large-degree polynomial, has a possibility of outputting predicted values close to corresponding true values for all of a plurality of sample cases, on the condition that the coefficients of the model are appropriately adjusted. Therefore, the model with high complexity tends to have a small bias.

However, the model with high complexity has a risk that the model depends excessively on the features of the sample cases used as training data, that is, a risk of overfitting. Generally, an overfitted model is not able to output correctly predicted values for other sample cases. For example, using an n-degree polynomial, it is possible to build a model (with zero residual) that outputs predicted values completely the same as true values for n+1 sample cases. However, the model with zero residual for certain sample cases is normally excessively complicated and has a high risk of outputting predicted values that have significantly large prediction errors for other sample cases. Therefore, the model with high complexity tends to have a large variance. In view of this point, the model with low complexity has a low risk of outputting predicted values that have significantly large prediction errors, and tends to have a small variance. That is to say, the bias and the variance as loss components depend on the features of a machine learning algorithm that builds a model.

Next, formal definitions about the loss, bias, and variance will be described. The following describes an example where squared loss is decomposed into bias and variance.

It is assumed that K pieces of training data $D_k$ (k is an integer from one to K) are extracted from the same data population, and K models are built. In addition, it is assumed that test data T including n test cases are extracted from the same data population as above. The i-th test case includes a value $X_i$ of an explanatory variable and a true value $Y_i$ of a response variable (i is an integer from one to n). A predicted value $y_{ik}$ of the response variable is calculated for the value $X_i$ of the explanatory variable from the k-th model.

A prediction error $e_{ik}$ calculated from the k-th model and the i-th test case is defined as $e_{ik}=Y_i-y_{ik}$, and the loss (squared loss) is defined as $e_{ik}^2$. For the i-th test case, the bias $B_i$, the variance $V_i$, and the loss $L_i$ are defined. The bias $B_i$ is defined as $B_i=E_D[e_{ik}]$, where $E_D[\ ]$ denotes an average value (i.e., expected value) across the K pieces of training data. The variance $V_i$ is defined as $V_i=V_D[e_{ik}]$, where $V_D[\ ]$ denotes a variance across the K pieces of training data. The loss $L_i$ is defined as $L_i=E_D[e_{ik}^2]$. The following equation, $L_i=B_i^2+V_i$, is satisfied from the above-described relationship among the loss, bias, and variance.

For the whole test data T, an expected bias EB2, an expected variance EV, and an expected loss EL are defined. The expected bias EB2 is defined as $EB2=E_X[B_i^2]$, where $E_X[\ ]$ denotes an average value (i.e., expected value) across the n pieces of test cases. The expected variance EV is defined as $EV=E_X[V_i]$, and the expected loss EL is defined as $EL=E_X[L_i]$. The following equation, EL=EB2+EV, is satisfied from the above-described relationship among the loss, bias, and variance.

Next, for estimating a prediction performance curve, a method of estimating how much prediction performances measured with each sample size vary (i.e., degree of variance) will be described. In the second embodiment, the above-described concept of the bias-variance decomposition is applied to the estimation of a variance of prediction performance.

The inventors of the present application have found that the variance of prediction performance at each sample size is approximated by the following equation: $VL_j=C\times(EL_j+EB2)\times(EL_j-EB2)$, where $VL_j$ denotes a variance of prediction performance at the sample size $s_j$, and C is a prescribed constant. In the second embodiment, the constant value C may be set to any value because a ratio of variances $VL_j$ at the plurality of sample sizes is used for estimating a prediction performance curve. For example, C may be set to one. $EL_j$ denotes an expected loss at the sample size $s_j$. EB2 denotes an expected bias for a machine learning algorithm. Hereinafter, the meaning of this equation will be described.

Figure 8:
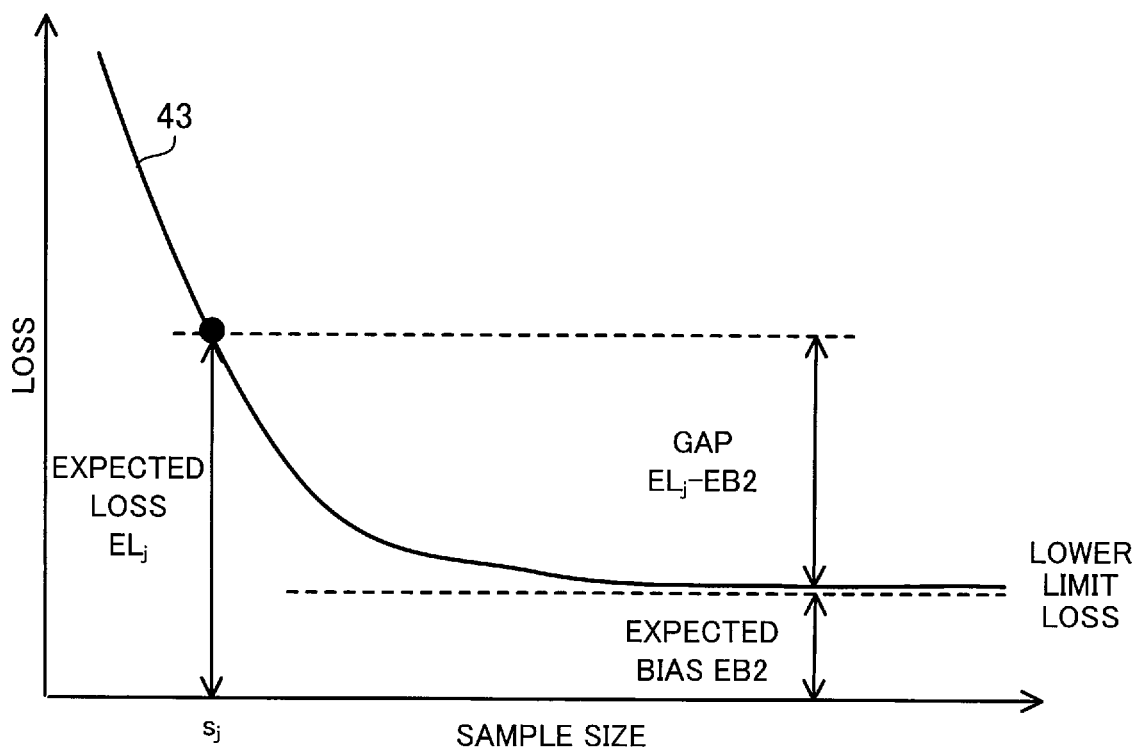
FIG. 8 is a graph representing an example of the relationship between sample size and loss.

FIG. 8 is a graph representing an example of the relationship between sample size and loss.

A curve 43 is a loss curve representing the relationship between sample size and estimated loss. The vertical axis in FIG. 3 represents prediction performance, whereas the vertical axis in FIG. 8 represents loss. As described earlier, prediction performance and loss may be converted between each other according to an index for the prediction performance and an index for the loss. The curve 43 is a nonlinear curve in which the loss monotonically decreases and approaches a certain lower limit loss as the sample size increases. The decrease rate of the loss is large while the sample size is small, and the decrease rate of the loss becomes smaller as the sample size increases.

The loss at a point on the curve 43 with respect to the sample size $s_j$ (i.e., a distance from loss of zero to the point on the curve 43) corresponds to an expected loss $EL_j$ at the sample size $s_j$. The lower limit loss specified by the curve 43 corresponds to the upper limit of the prediction performance specified by the curve 21 of FIG. 3, and is larger than zero. For example, if an upper limit of the prediction performance is taken as c, the lower limit loss is 1-c in the case where the accuracy index is used for the prediction performance, the lower limit loss is c in the case where the MSE index is used for the prediction performance, and the lower limit loss is $c^2$ in the case where the RMSE index is used for the prediction performance. The lower limit loss corresponds to the expected bias EB2 for this machine learning algorithm. This is because, when the sample size is sufficiently large, the features of training data to be used in the machine learning match the features of the data population, and thus the expected variance approaches zero.

The difference between the expected loss $EL_j$ and the expected bias EB2 may be called a gap for the sample size $s_j$. The gap represents a possibility that the machine learning algorithm is able to reduce the loss by using a larger sample size. The gap corresponds to the distance between a point on the curve 21 of FIG. 3 and the upper limit of the prediction performance, and also represents a possibility that the machine learning algorithm improves the prediction performance by using a larger sample size. The gap is affected by an expected variance at the sample size $s_j$.

The above-described approximate equation of the variance $VL_j$ includes a term of $EL_j+EB2$ and a term of $EL_j-EB2$. This means that the variance $VL_j$ has a feature of being proportional to the sum of an expected loss and an expected bias and a feature of being proportional to a gap, i.e., the difference between the expected loss and the expected bias.

In a machine learning algorithm that has a sufficiently small expected bias EB2, that is, that exhibits a sufficiently high upper limit of prediction performance, the value of $EL_j+EB2$ and the value of $EL_j-EB2$ both vary even when the sample size is increased to a certain extent. In this case, the value of $EL_j+EB2$ is approximated to the value of $EL_j-EB2$. Therefore, the variance $VL_j$ as a whole tends to be proportional to the square of a gap. On the other hand, in a machine learning algorithm that has a sufficiently large expected bias EB2, that is, that does not exhibit a sufficiently high upper limit of prediction performance, the value of $EL_j+EB2$ varies little when the sample size is increased to a certain extent, and it is fixed at an early stage. Therefore, the variance $VL_j$ as a whole tends to be proportional to the gap. That is to say, machine learning algorithms are classified into two cases: one is that the variance $VL_j$ is approximately proportional to the square of a gap, and the other is that the variance $VL_j$ is proportional to a gap.

How to derive the equation, $VL_j=C\times(EL_j+EB2)\times(EL_j-EB2)$, used in the second embodiment, will be described in detail later.

The following describes how the machine learning apparatus 100 operates.

Figure 9:
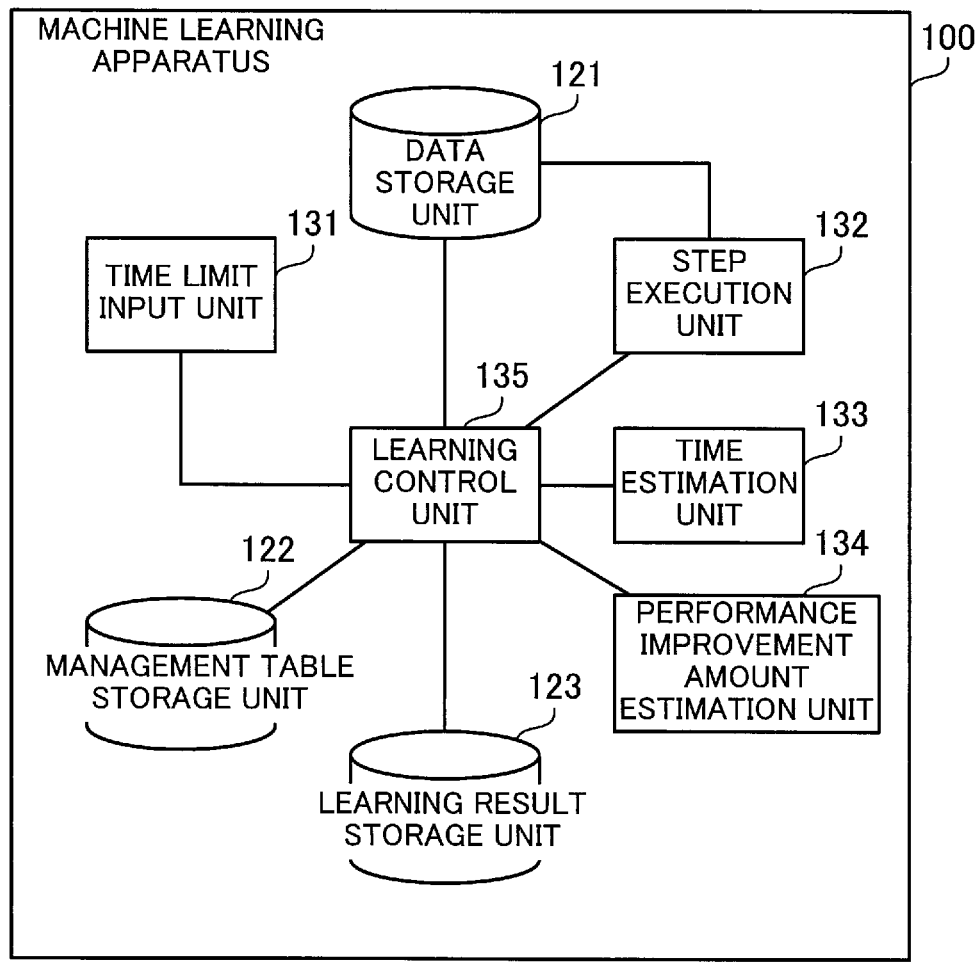
FIG. 9 is a block diagram illustrating an example of functions of the machine learning apparatus.

FIG. 9 is a block diagram illustrating an example of functions of the machine learning apparatus.

The machine learning apparatus 100 includes a data storage unit 121, a management table storage unit 122, a learning result storage unit 123, a time limit input unit 131, a step execution unit 132, a time estimation unit 133, a performance improvement amount estimation unit 134, and a learning control unit 135. For example, the data storage unit 121, the management table storage unit 122, and the learning result storage unit 123 are implemented by using storage space set aside in the RAM 102 or the HDD 103. For example, the time limit input unit 131, the step execution unit 132, the time estimation unit 133, the performance improvement amount estimation unit 134, and the learning control unit 135 are implemented by using program modules that are executed by the CPU 101.

The data storage unit 121 stores therein datasets for use in machine learning. A dataset is a collection of unit data, and each unit data includes a value (i.e., result) of a response variable and a value (i.e., cause) of at least one explanatory variable. Data stored in the data storage unit 121 is collected by the machine learning apparatus 100 or another information processing apparatus from various kinds of devices. Alternatively, such data may be entered by a user to the machine learning apparatus 100 or another information processing apparatus.

The management table storage unit 122 stores therein a management table for managing advancement of machine learning. The management table is updated by the learning control unit 135. The management table will be described in detail later.

The learning result storage unit 123 stores therein results of machine learning. A result of machine learning includes a model representing the relationship between a response variable and at least one explanatory variable. For example, a coefficient that indicates a weight for an explanatory variable is determined by the machine learning. In addition, the result of the machine learning includes the prediction performance of the learned model. Furthermore, the result of the machine learning includes information about a machine learning algorithm and a sample size used to learn the model. The information about the machine learning algorithm may include a hyperparameter used in the machine learning.

The time limit input unit 131 obtains information about the time limit of machine learning and notifies the learning control unit 135 of the time limit. The information about the time limit may be entered by a user with the input device 112. The information about the time limit may be read from a setting file stored in the RAM 102 or the HDD 103. The information about the time limit may be received from another information processing apparatus over the network 114.

The step execution unit 132 executes a plurality of machine learning algorithms. The step execution unit 132 is informed of a specified machine learning algorithm and sample size by the learning control unit 135. After that, using the data stored in the data storage unit 121, the step execution unit 132 executes a learning step with the specified sample size according to the specified machine learning algorithm. That is, the step execution unit 132 extracts training data and test data from the data storage unit 121 on the basis of the specified sample size. The step execution unit 132 learns a model using the training data according to the specified machine learning algorithm and calculates the prediction performance using the test data.

To learn a model and calculate the prediction performance thereof, the step execution unit 132 may perform any one of various kinds of validation methods such as cross validation and random sub-sampling validation. The validation method to be used may previously be set in the step execution unit 132. In addition, the step execution unit 132 measures the execution time of an individual learning step. The step execution unit 132 outputs the model, the prediction performance, and the execution time to the learning control unit 135.

The time estimation unit 133 estimates the execution time of a learning step with respect to a machine learning algorithm. The time estimation unit 133 is informed of a specified machine learning algorithm and sample size by the learning control unit 135. After that, the time estimation unit 133 generates an execution time estimation equation on the basis of the execution times of previously executed learning steps belonging to the specified machine learning algorithm. The time estimation unit 133 estimates the execution time with the generated estimation equation on the basis of the specified sample size. The time estimation unit 133 outputs the estimated execution time to the learning control unit 135.

The performance improvement amount estimation unit 134 estimates the performance improvement amount of a learning step with respect to a machine learning algorithm. The performance improvement amount estimation unit 134 is informed of a specified machine learning algorithm and sample size by the learning control unit 135. After that, the performance improvement amount estimation unit 134 generates a prediction performance estimation equation on the basis of the prediction performances obtained in previously executed learning steps belonging to the specified machine learning algorithm. The performance improvement amount estimation unit 134 estimates a prediction performance with the generated estimation equation on the basis of the specified sample size. At this time, the performance improvement amount estimation unit 134 uses a prediction performance like the UCB, which is larger than an expected value, considering statistical errors. The performance improvement amount estimation unit 134 calculates the amount of improvement from the currently achieved prediction performance and outputs the improvement amount to the learning control unit 135.

The learning control unit 135 controls machine learning that uses a plurality of machine learning algorithms. The learning control unit 135 causes the step execution unit 132 to execute at least one learning step according to each of the plurality of machine learning algorithms. Every time a single learning step is executed, the learning control unit 135 causes the time estimation unit 133 to estimate the execution time of the next learning step with respect to the same machine learning algorithm, and causes the performance improvement amount estimation unit 134 to estimate the performance improvement amount of the next learning step. The learning control unit 135 calculates an improvement rate by dividing the performance improvement amount by the corresponding execution time.

In addition, the learning control unit 135 selects a machine learning algorithm with the highest improvement rate from the plurality of machine learning algorithms, and causes the step execution unit 132 to execute the next learning step according to the selected machine learning algorithm. The learning control unit 135 repeatedly updates the improvement rates and selects a machine learning algorithm until the prediction performance satisfies a prescribed stopping condition or the learning time exceeds a time limit. Among the models obtained until the machine learning is stopped, the learning control unit 135 stores a model with the highest prediction performance in the learning result storage unit 123. In addition, the learning control unit 135 stores the prediction performance, information about the machine learning algorithm, and information about the sample size in the learning result storage unit 123.

FIG. 10 illustrates an example of a management table.

The management table 122a is created by the learning control unit 135 and is stored in the management table storage unit 122. The management table 122a has the following columns: "algorithm ID," "sample size," "improvement rate," "prediction performance," and "execution time."

The "algorithm ID" column contains identification information identifying a machine learning algorithm. In the following description, the algorithm ID of the i-th machine learning algorithm (i is an integer of one or greater) may be denoted by $a_i$. The "sample size" column contains a sample size for a learning step to be executed next in a corresponding machine learning algorithm. In the following description, a sample size corresponding to the i-th machine learning algorithm may be denoted by $k_i$.

Step numbers and sample sizes have one-to-one correspondence. In the following, the sample size of the j-th learning step may be denoted by $s_j$. For example, $s_1 = |D|/2^{10}$ and $s_j = s_1 \times 2^{j-1}$ are set, where D denotes a dataset stored in the data storage unit 121 and $|D|$ denotes the size of the dataset D (i.e., the number of pieces of unit data).

The "improvement rate" column contains an estimated improvement rate in the learning step to be executed next, with respect to a corresponding machine learning algorithm. For example, the unit of improvement rate is [seconds$^{-1}$]. In the following description, the improvement rate of the i-th machine learning algorithm may be denoted by $r_i$. The "prediction performance" column lists the observed prediction performances of already executed learning steps with respect to a corresponding machine learning algorithm. In the following description, the prediction performance calculated in the j-th learning step according to the i-th machine learning algorithm may be denoted by $p_{i,j}$. The "execution time" column lists the observed execution times of already executed learning steps with respect to a corresponding machine learning algorithm. For example, the unit of execution time is [seconds]. In the following description, the execution time of the j-th learning step with respect to the i-th machine learning algorithm may be denoted by $T_{i,j}$.

Figure 11:
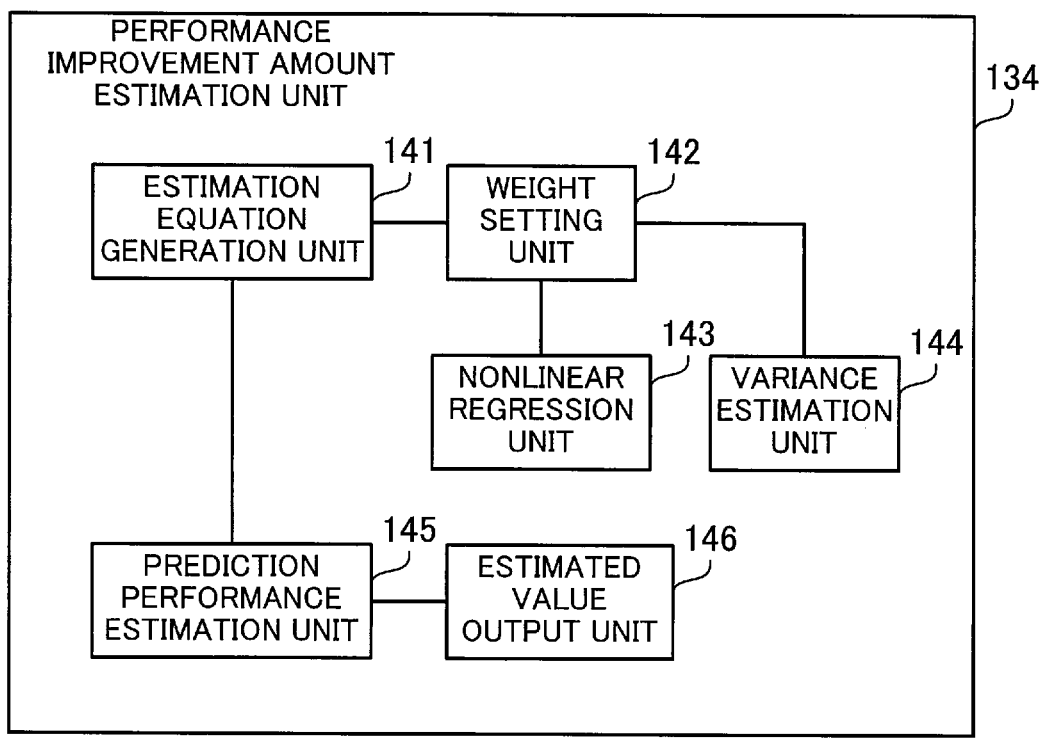
FIG. 11 is a block diagram illustrating an example of functions of a performance improvement amount estimation unit.

FIG. 11 is a block diagram illustrating an example of functions of the performance improvement amount estimation unit.

The performance improvement amount estimation unit 134 includes an estimation equation generation unit 141, a weight setting unit 142, a nonlinear regression unit 143, a variance estimation unit 144, a prediction performance estimation unit 145, and an estimated value output unit 146.

The estimation equation generation unit 141 estimates a prediction performance curve representing the relationship between sample size and prediction performance with respect to a machine learning algorithm, on the basis of a history of executions of the machine learning algorithm. In the prediction performance curve, the prediction performance approaches a certain limit value as the sample size increases, and the prediction performance varies greatly while the sample size is small, and the prediction performance varies little while the sample size is large. An expected value of prediction performance is represented as a nonlinear equation, such as $y = c - \exp(a \times \log(x) + b)$, where x is an explanatory variable indicating a sample size, y is a response variable indicating a prediction performance, and a, b, and c are coefficients.

The coefficients a, b, and c are determined through a nonlinear regression analysis. The estimation equation generation unit 141 obtains a set $<x_1, y_j>$ of a sample size $x_j$ and a measured prediction performance $y_j$ of an executed learning step, as observed data to be used in the estimation of a prediction performance curve. The estimation equation generation unit 141 instructs the weight setting unit 142 to determine the coefficients a, b, and c on the basis of the observed data. The estimation equation generation unit 141 generates a nonlinear equation that includes the determined coefficients a, b, and c, as a function for estimating an expected value of prediction performance from a sample size. In addition, the estimation equation generation unit 141 generates a function for estimating a variance of prediction performance from a sample size. The variance at each sample size is obtained through the above nonlinear regression analysis, together with the expected value of prediction performance at the sample size, by a statistical process. The estimation equation generation unit 141 outputs, to the prediction performance estimation unit 145, the function for obtaining an expected value and the function for obtaining a variance with respect to the prediction performance curve.

The weight setting unit 142 sets a weight $w_j$ for each sample size $x_j$ indicated in result data to be used in a nonlinear regression analysis. The weight setting unit 142 first initializes the weight $w_j$ to one. The weight setting unit 142 notifies the nonlinear regression unit 143 of the set weight $w_j$, and obtains the coefficients a, b, and c calculated through the nonlinear regression analysis from the nonlinear regression unit 143. The weight setting unit 142 determines whether the coefficients a, b, and c have sufficiently converged. If the coefficients a, b, and c have not sufficiently converged yet, the weight setting unit 142 notifies the variance estimation unit 144 of the coefficient c to obtain a variance $VL_j$, which depends on the coefficient c, for each sample size $x_j$ from the variance estimation unit 144. The weight setting unit 142 then updates the weight $w_j$ on the basis of the variance $VL_j$. In general, the variance $VL_j$ and the weight $w_j$ are inversely proportional to each other: the higher the $VL_j$ is, the smaller the $w_j$ to be set. For example, the weight setting unit 142 uses an equation, $w_j = 1/VL_1$. The weight setting unit 142 notifies the nonlinear regression unit 143 of the updated weight $w_1$. The weight setting unit 142 repeatedly updates the weight $w_j$ and the coefficient c until the coefficients a, b, and c sufficiently converge, in the way as described above.

The nonlinear regression unit 143 determines the coefficients a, b, and c by fitting a set $<x_j, y_j>$ of the result data to the above nonlinear equation using the weight $w_j$ received from the weight setting unit 142. The nonlinear regression unit 143 notifies the weight setting unit 142 of the determined coefficients a, b, and c. The nonlinear regression analysis carried out by the nonlinear regression unit 143 is a weighted regression analysis. Relatively large residuals are accepted for a sample size with a low weight, and a relatively large restriction is imposed on the residuals for a sample size with a high weight. For example, the coefficients a, b, and c are determined such that the evaluation value obtained by summing up products of the weights for respective sample sizes and the squares of corresponding residuals is minimized. Therefore, to reduce the residuals for a sample size with a high weight is prioritized. In general, to reduce the residuals for a large sample size is prioritized since a higher weight is set for a larger sample size.

The variance estimation unit 144 estimates a variance $VL_j$ at each sample size $x_j$ with respect to errors included in the prediction performance $y_j$ of the result data, using the coefficient c received from the weight setting unit 142. The variance $VL_j$ is calculated from the expected bias EB2 and the expected loss $EL_j$ for the sample size $x_j$, as described earlier. More specifically, the variance $VL_j$ is calculated as $VL_j=C\times(EL_j+EB2)\times(EL_j-EB2)$. However, only a ratio of $VL_j$ among a plurality of sample sizes is important, and each $VL_j$ value itself is not important. Therefore, the variance estimation unit 144 takes the constant C=1 for simple calculation. The expected bias EB2 is calculated from the coefficient c. The expected loss $EL_j$ is calculated from the prediction performance $y_j$. The variance estimation unit 144 notifies the weight setting unit 142 of the estimated variance $VL_j$.

The prediction performance estimation unit 145 estimates an expected value and a variance of prediction performance at the sample size $k_i$ using the functions received from the estimation equation generation unit 141 and the sample size $k_i$ specified by the learning control unit 135. That is, the prediction performance estimation unit 145 substitutes $k_i$ for an argument of the function for outputting an expected value, and substitutes $k_i$ for an argument of the function for outputting a variance, to thereby calculate the expected value and the variance. The prediction performance estimation unit 145 notifies the estimated value output unit 146 of the estimated expected value and variance.

The estimated value output unit 146 calculates a performance improvement amount $g_{i,j+1}$ using the expected value and variance of prediction performance received from the prediction performance estimation unit 145. For example, the estimated value output unit 146 calculates an estimated upper limit Up of the 95% prediction interval of the prediction performance on the basis of the expected value and variance of prediction performance. The estimated value output unit 146 calculates a performance improvement amount $g_{i,j+1}$ by subtracting the currently achieved prediction performance P from the estimated upper limit Up. In this connection, the performance improvement amount $g_{i,j+1}$ is zero if Up−P<0 is satisfied. The estimated value output unit 146 notifies the learning control unit 135 of the calculated performance improvement amount $g_{i,j+1}$.

Figure 12:
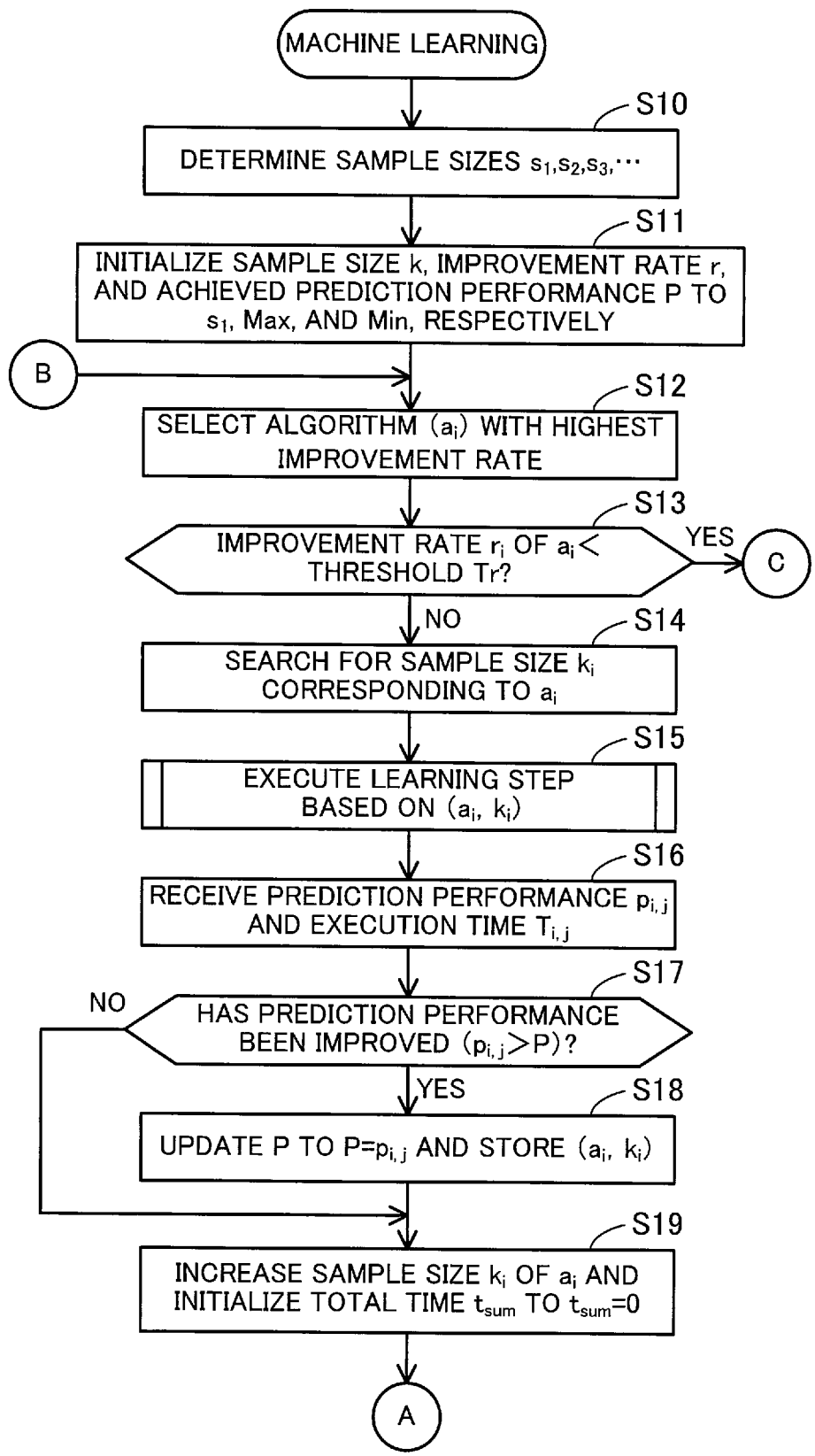
FIGS. 12 and 13 are a flowchart illustrating an example of a machine learning procedure.
Figure 13:
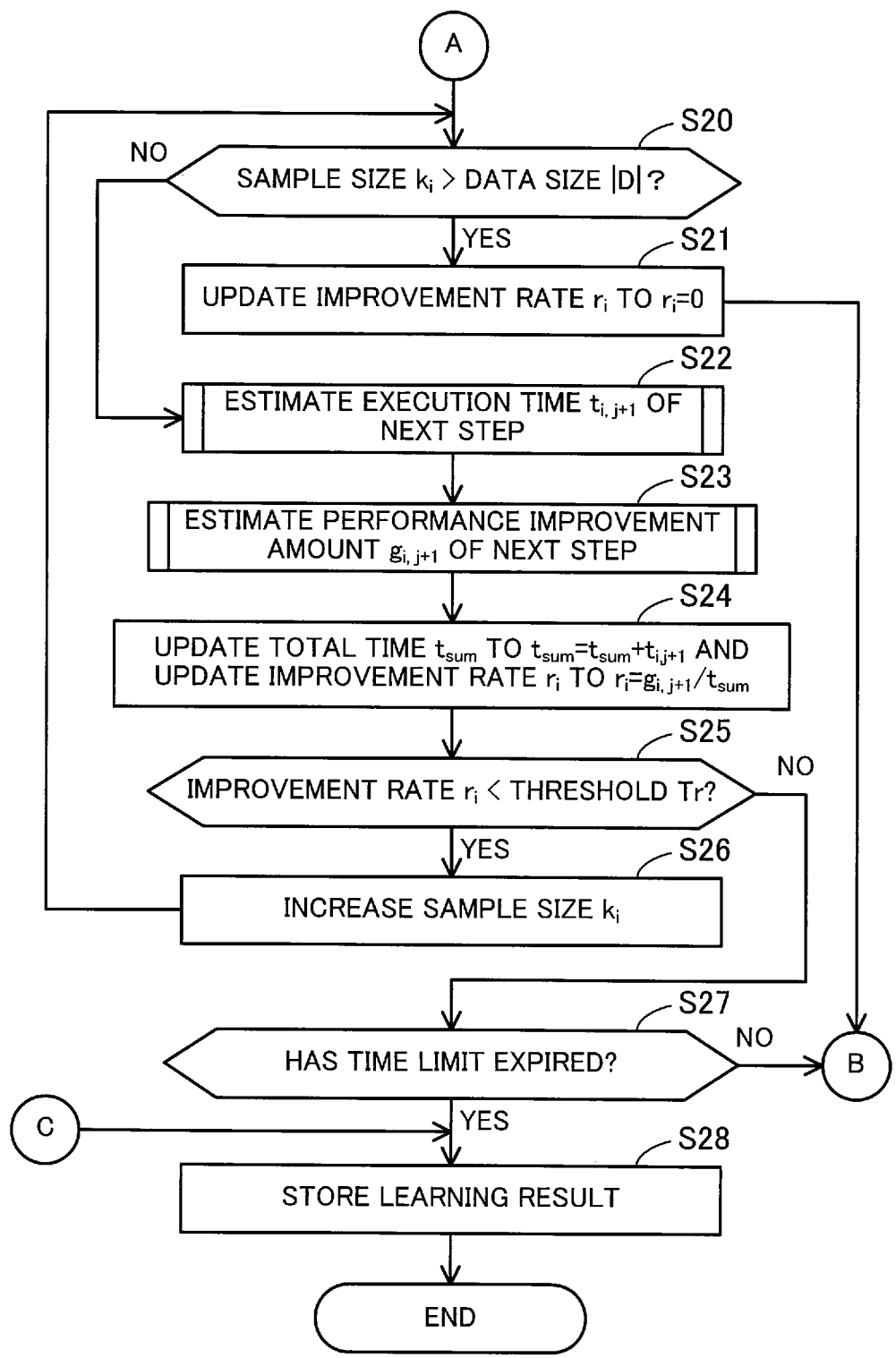

FIGS. 12 and 13 are a flowchart illustrating an example of a machine learning procedure.

(S10) The learning control unit 135 accesses the data storage unit 121 to determine sample sizes $s_1, s_2, s_3, \ldots$ to be used for learning steps in the progressive sampling method. For example, the learning control unit 135 determines $s_1=|D|/2^{10}$ and $s_j=s_1\times 2^{j-1}$ on the basis of the size of a dataset D stored in the data storage unit 121.

(S11) The learning control unit 135 initializes the sample size for an individual machine learning algorithm to a minimum value $s_1$ in the management table 122a. In addition, the learning control unit 135 initializes the improvement rate for an individual machine learning algorithm to a maximum possible value. In addition, the learning control unit 135 initializes the achieved prediction performance P to a minimum possible value (for example, zero).

(S12) The learning control unit 135 selects a machine learning algorithm with the highest improvement rate from the management table 122a. The selected machine learning algorithm is denoted by $a_i$.

(S13) The learning control unit 135 determines whether the improvement rate $r_i$ of the machine learning algorithm $a_i$ is less than a threshold Tr. The threshold Tr may be set in advance in the learning control unit 135. For example, the threshold Tr of 0.001/3600 is set. If the improvement rate $r_i$ is less than the threshold Tr, the procedure proceeds to step S28. Otherwise, the procedure proceeds to step S14.

(S14) The learning control unit 135 searches the management table 122a for a next sample size $k_i$ corresponding to the machine learning algorithm $a_i$.

(S15) The learning control unit 135 informs the step execution unit 132 of the specified machine learning algorithm $a_i$ and sample size $k_i$. The step execution unit 132 executes a learning step with the sample size $k_i$ according to the machine learning algorithm $a_i$. The processing of the step execution unit 132 will be described in detail later.

(S16) The learning control unit 135 receives the learned model, the prediction performance $p_{i,j}$ of the model, and the execution time $T_{i,j}$ from the step execution unit 132.

(S17) The learning control unit 135 compares the prediction performance $p_{i,j}$ received at step S16 with the achieved prediction performance P (the highest prediction performance achieved up to the current time), and determines whether the former is higher than the latter. If the prediction performance $p_{i,j}$ is higher than the achieved prediction performance P, the procedure proceeds to step S18. Otherwise, the procedure proceeds to step S19.

(S18) The learning control unit 135 updates the achieved prediction performance P to the prediction performance $p_{i,j}$. In addition, the learning control unit 135 stores the machine learning algorithm $a_i$ and the sample size $k_i$ that have exhibited the prediction performance, in association with the achieved prediction performance P.

(S19) The learning control unit 135 increases the sample size $k_i$ registered in the management table 122a to the next larger sample size (for example, twice the current sample size). In addition, the learning control unit 135 initializes the total time $t_{sum}$ to zero.

Refer now to FIG. 13.

(S20) The learning control unit 135 compares the updated sample size $k_i$ corresponding to the machine learning algorithm $a_i$ with the size of the dataset D stored in the data storage unit 121 and determines whether the former is larger than the latter. If the sample size $k_i$ is larger than the size of the dataset D, the procedure proceeds to step S21. Otherwise, the procedure proceeds to step S22.

(S21) The learning control unit 135 updates, among the improvement rates registered in the management table 122a, the improvement rate $r_i$ corresponding to the machine learning algorithm $a_i$ to zero. Thereby, the machine learning algorithm $a_i$ is no longer executed. Then, the procedure returns to step S12.

(S22) The learning control unit 135 informs the time estimation unit 133 of the specified machine learning algorithm $a_i$ and sample size $k_i$. The time estimation unit 133 estimates an execution time $t_{i,j+1}$ needed to execute the next learning step with the sample size $k_i$ according to the machine learning algorithm $a_i$. The processing of the time estimation unit 133 will be described in detail later.

(S23) The learning control unit 135 informs the performance improvement amount estimation unit 134 of the specified machine learning algorithm $a_i$ and sample size $k_i$. The performance improvement amount estimation unit 134 estimates a performance improvement amount $g_{i,j+1}$ to be obtained when the next learning step is executed with the sample size $k_i$ according to the machine learning algorithm $a_i$. The processing of the performance improvement amount estimation unit 134 will be described in detail later.

(S24) On the basis of the execution time $t_{i,j+1}$ received from the time estimation unit 133, the learning control unit 135 updates the total time $t_{sum}$ to $t_{sum}+t_{i,j+1}$. In addition, on the basis of the updated total time $t_{sum}$ and the performance improvement amount $g_{i,j+1}$ received from the performance improvement amount estimation unit 134, the learning control unit 135 calculates the improvement rate $r_i=g_{i,j+1}/t_{sum}$. The learning control unit 135 updates the improvement rate $r_i$ to the calculated value in the management table 122a.

(S25) The learning control unit 135 determines whether the improvement rate $r_i$ is less than the threshold Tr. If the improvement rate $r_i$ is less than the threshold Tr, the procedure proceeds to step S26. Otherwise, the procedure proceeds to step S27.

(S26) The learning control unit 135 increases the sample size $k_i$ to the next larger sample size. Then, the procedure returns to step S20.

(S27) The learning control unit 135 determines whether the time that has elapsed since the start of the machine learning has exceeded the time limit specified by the time limit input unit 131. If the elapsed time has exceeded the time limit, the procedure proceeds to step S28. Otherwise, the procedure returns to step S12.

(S28) The learning control unit 135 stores the achieved prediction performance P and the model that has exhibited the achieved prediction performance in the learning result storage unit 123. In addition, the learning control unit 135 stores the algorithm ID of the machine learning algorithm and the sample size that are associated with the achieved prediction performance P, in the learning result storage unit 123. At this time, the learning control unit 135 may additionally store hyperparameters set in the machine learning algorithm.

Figure 14:
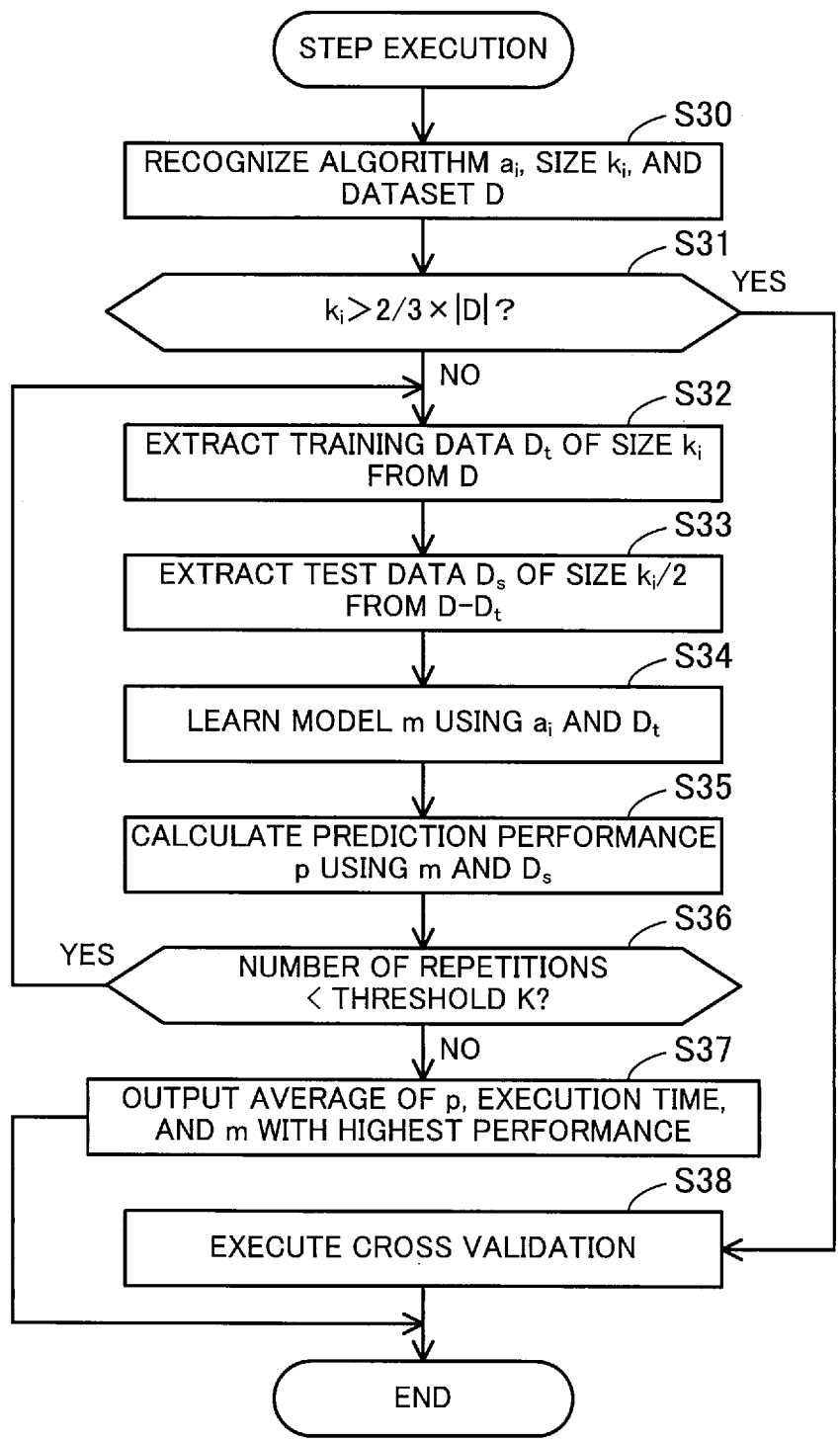
FIG. 14 is a flowchart illustrating an example of a procedure of executing steps.

FIG. 14 is a flowchart illustrating an example of a procedure of executing steps.

The following describes a case where the random sub-sampling validation or the cross validation is executed as a validation method, depending on the size of a dataset D. Alternatively, the step execution unit 132 may execute another validation method.

(S30) The step execution unit 132 recognizes the machine learning algorithm $a_i$ and the sample size $k_i=s_{j+1}$ specified by the learning control unit 135. In addition, the step execution unit 132 recognizes the dataset D stored in the data storage unit 121.

(S31) The step execution unit 132 determines whether the sample size $k_i$ is larger than ⅔ of the size of the dataset D. If the sample size $k_i$ is larger than ⅔×|D|, the step execution unit 132 selects the cross validation since the data size is insufficient. In this case, the procedure proceeds to step S38. If the sample size $k_i$ is equal to or less than ⅔×|D|, the step execution unit 132 selects the random sub-sampling validation since the data size is sufficient. In this case, the procedure proceeds to step S32.

(S32) The step execution unit 132 randomly extracts training data $D_t$ of the sample size $K_i$ from the dataset D. The training data is extracted by random sampling without replacement. Thus, the training data includes $k_i$ pieces of unit data different from each other.

(S33) The step execution unit 132 randomly extracts test data $D_s$ of the size $k_i/2$ from the dataset D excluding the training data $D_t$. The test data is extracted by random sampling without replacement. Thus, the test data includes $k_i/2$ pieces of unit data that is different from the training data $D_t$ and that is different from each other. In this connection, while the ratio of the size of the training data $D_t$ to the size of the test data $D_s$ is 2:1 in this example, a different ratio may be used.

(S34) The step execution unit 132 learns a model m using the training data $D_t$ extracted from the dataset D, according to the machine learning algorithm $a_i$.

(S35) The step execution unit 132 calculates the prediction performance p of the model m using the learned model m and the test data $D_s$ extracted from the dataset D. Any index such as accuracy, precision, MSE, or RMSE may be used as an index representing the prediction performance p. The index representing the prediction performance p may be set in advance in the step execution unit 132.

(S36) The step execution unit 132 compares the number of repetitions of steps S32 to S35 with a threshold K to determine whether the former is less than the latter. The threshold K may be previously set in the step execution unit 132. For example, the threshold K is set to ten. If the number of repetitions is less than the threshold K, the procedure returns to step S32. Otherwise, the procedure proceeds to step S37.

(S37) The step execution unit 132 calculates the average value of the K prediction performances p calculated at step S35 and outputs the average value as a prediction performance $p_{i,j}$. In addition, the step execution unit 132 calculates and outputs the execution time $T_{i,j}$ needed from the start of step S30 to the end of the repetitions of steps S32 to S36. In addition, the step execution unit 132 outputs a model with the highest prediction performance p among the K models learned at step S34. Then, the single learning step employing the random sub-sampling validation is completed.

(S38) The step execution unit 132 executes the above-described cross validation, instead of the above-described random sub-sampling validation. For example, the step execution unit 132 randomly extracts sample data of the sample size $k_i$ from the dataset D and equally divides the extracted sample data into K blocks. The step execution unit 132 repeats using (K−1) blocks as the training data and one block as the test data K times while changing the block used as the test data. The step execution unit 132 outputs the average value of the K prediction performances, the execution time, and a model with the highest prediction performance.

Figure 15:
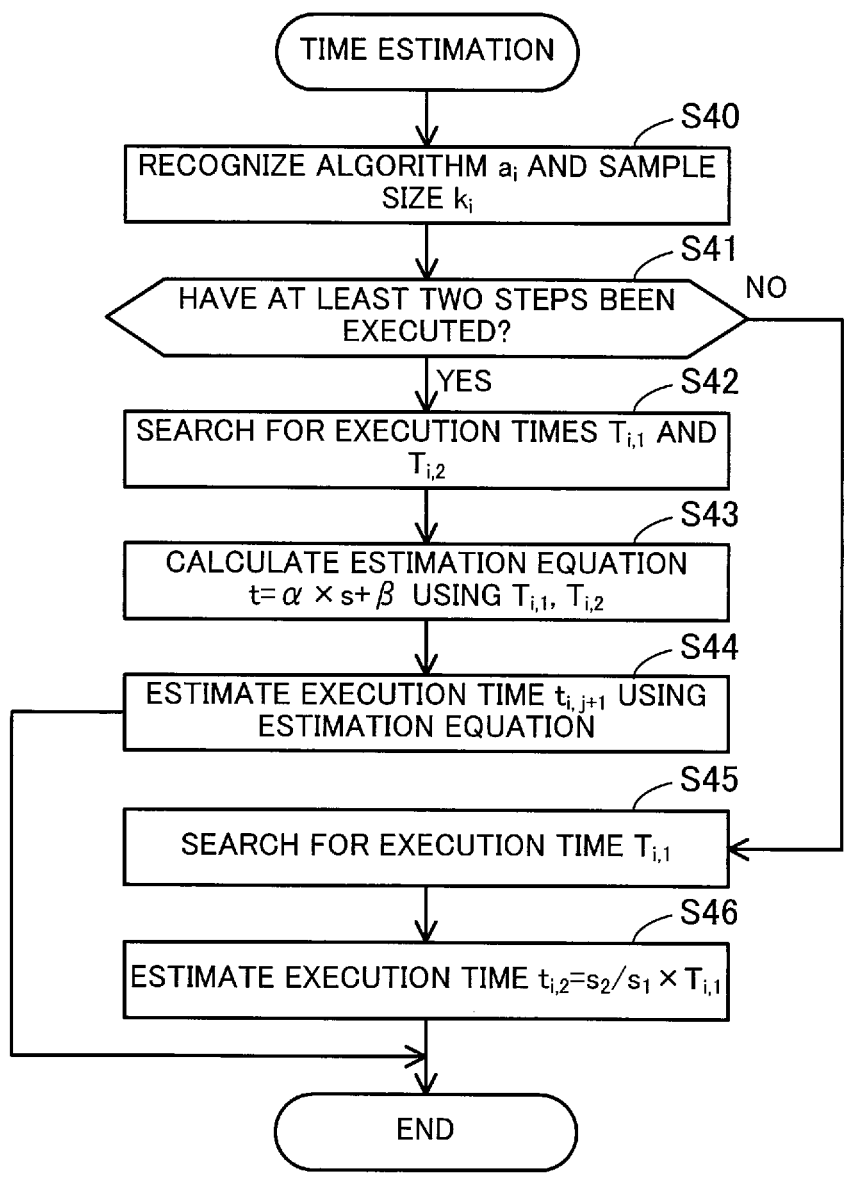
FIG. 15 is a flowchart illustrating an example of a procedure of estimating time.

FIG. 15 is a flowchart illustrating an example of a procedure of estimating time.

(S40) The time estimation unit 133 recognizes the machine learning algorithm $a_i$ and sample size $k_i=s_{j+1}$ specified by the learning control unit 135.

(S41) The time estimation unit 133 determines whether at least two learning steps using different sample sizes have been executed with respect to the machine learning algorithm $a_i$. If at least two learning steps have been executed, the procedure proceeds to step S42. Otherwise, the procedure proceeds to step S45.

(S42) The time estimation unit 133 searches the management table 122a for execution times $T_{i,1}$ and $T_{i,2}$ corresponding to the machine learning algorithm $a_i$.

(S43) Using the sample sizes $s_1$ and $s_2$ and the execution times $T_{i,1}$ and $T_{i,2}$, the time estimation unit 133 determines coefficients $\alpha$ and $\beta$ in an estimation equation $t=\alpha \times s+\beta$ for estimating an execution time t from a sample size s. The coefficients $\alpha$ and $\beta$ are determined by solving simultaneous equations: an equation in which $T_{i,1}$ and $s_1$ are substituted for t and s, respectively, and an equation in which $T_{i,2}$ and $s_2$ are substituted for t and s, respectively. If three or more learning steps have already been executed with respect to the machine learning algorithm $a_i$, the time estimation unit 133 may determine the coefficients $\alpha$ and $\beta$ through the regression analysis based on the execution times of the learning steps. Here, it is assumed that a sample size and an execution time are expressed by a first-degree equation.

(S44) The time estimation unit 133 estimates the execution time $t_{i,j+1}$ of the next learning step using the above-described execution time estimation equation and the sample size $k_i$ (by substituting $k_i$ for s in the estimation equation). The time estimation unit 133 outputs the estimated execution time $t_{i,j+1}$.

(S45) The time estimation unit 133 searches the management table 122a for the execution time corresponding to the machine learning algorithm $a_i$.

(S46) The time estimation unit 133 estimates the execution time $t_{i,2}$ of the second learning step to be $s_2/s_1 \times T_{i,1}$ on the basis of the sample sizes $s_1$ and $s_2$ and the execution time $T_{i,1}$. The time estimation unit 133 outputs the estimated execution time $t_{i,2}$.

Figure 16:
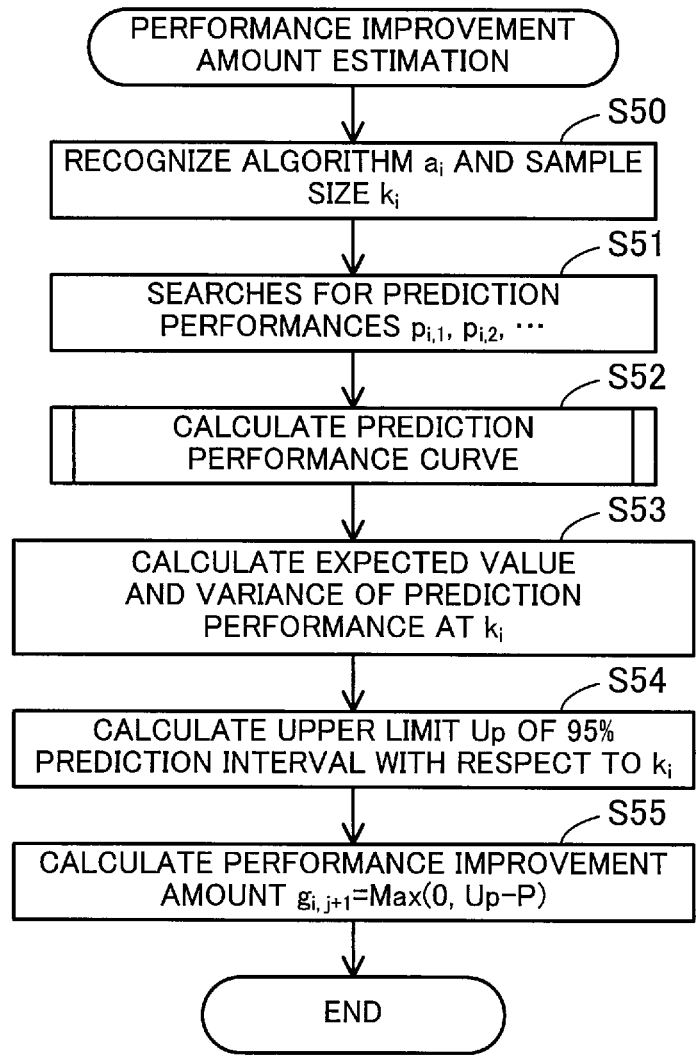
FIG. 16 is a flowchart illustrating an example of a procedure of estimating a performance improvement amount.

FIG. 16 is a flowchart illustrating an example of a procedure of estimating a performance improvement amount.

(S50) The estimation equation generation unit 141 in the performance improvement amount estimation unit 134 recognizes the machine learning algorithm $a_i$ and sample size $k_i=s_{j+1}$ specified by the learning control unit 135.

(S51) The estimation equation generation unit 141 searches the management table 122a for all prediction performances $p_{i,1}, p_{i,2}, \ldots$ corresponding to the machine learning algorithm $a_i$.

(S52) The estimation equation generation unit 141 calculates a prediction performance curve for estimating a prediction performance from a sample size, using the sample sizes $s_1, s_2, \ldots$ and the prediction performances $p_{i,1}, p_{i,2}, \ldots$, which are observed values. For example, information about the calculated prediction performance curve includes a function for obtaining an expected value of prediction performance from a sample size and a function for obtaining a variance of prediction performance from a sample size. The calculation of the prediction performance curve will be described in detail later.

(S53) The prediction performance estimation unit 145 calculates an expected value of prediction performance at the sample size $k_i$ on the basis of the prediction performance curve calculated at step S52 and the sample size $k_i$ (for example, by substituting $k_i=s_{j+1}$ into the function). Similarly, the prediction performance estimation unit 145 calculates a variance of prediction performance at the sample size $k_i$ on the basis of the prediction performance curve and the sample size $k_i$.

(S54) The estimated value output unit 146 calculates an estimated upper limit Up of the 95% prediction interval on the basis of the expected value and variance calculated at step S53 with respect to the sample size $k_i$.

(S55) The estimated value output unit 146 compares the current achieved prediction performance P with the estimated upper limit Up to calculate the performance improvement amount $g_{i,j+1}$, and outputs the calculated performance improvement amount $g_{i,j+i}$. The performance improvement amount $g_{i,j+1}$ is Up-P if Up>P, and is zero if Up≤P.

Figure 17:
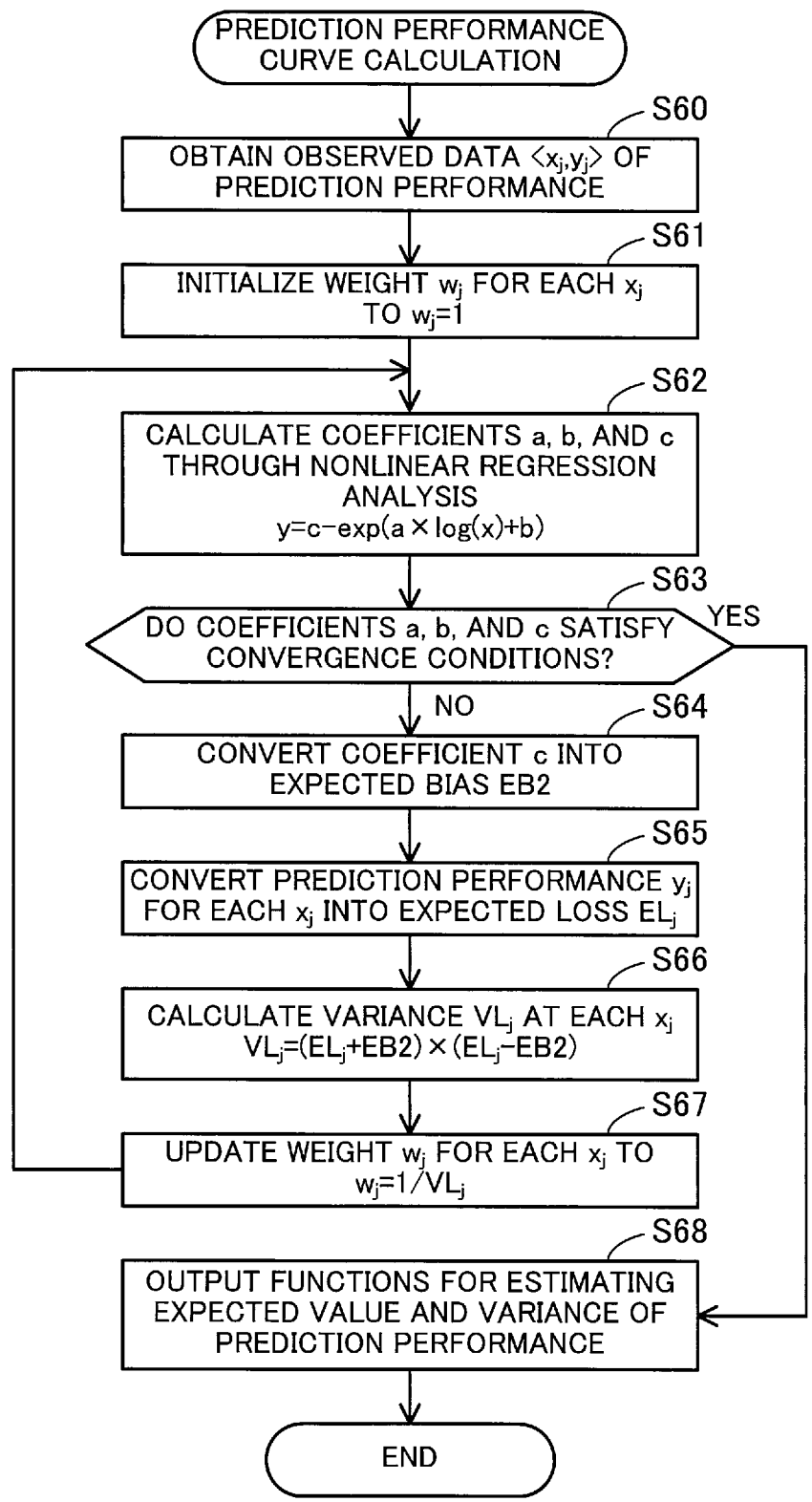
FIG. 17 is a flowchart illustrating an example of a procedure of calculating a prediction performance curve.

FIG. 17 is a flowchart illustrating an example of a procedure of calculating a prediction performance curve.

This calculation of a prediction performance curve is performed at step S52.

(S60) The estimation equation generation unit 141 obtains a set $<x_j, y_j>$, which is a combination of sample size $x_j$ and prediction performance $y_j$, as observed data of prediction performance. This observed data serves as training data for use in learning a prediction performance curve.

(S61) The weight setting unit 142 initializes a weight $w_j$ for each $x_j$ to one.

(S62) The nonlinear regression unit 143 calculates the coefficients a, b, and c of the nonlinear equation, $y=c-\exp(a \times \log(x)+b)$, through a nonlinear regression analysis using the set $<x_1, y_j>$ obtained at step S60. The sample size x is an explanatory variable, and the prediction performance y is a response variable. This nonlinear regression analysis is a weighted regression analysis, which gives a weight $w_j$ for each $x_j$ in evaluation of residuals. Relatively large residuals are accepted for a sample size with a low weight, whereas a relatively large restriction is imposed on the residuals for a sample size with a high weight. Different weights may be set for different sample sizes. Therefore, it is possible to compensate for a degradation in the accuracy of the regression analysis due to a variance of prediction performance not satisfying homoscedasticity (i.e., heterogeneity of variance). In this connection, the above nonlinear equation is an example of estimation equation, and another nonlinear equation indicating a curve in which y approaches a certain limit value as x increases may be used. For example, such a nonlinear regression analysis is carried out by the use of statistical package software.

(S63) The weight setting unit 142 compares the current coefficients a, b, and c calculated at step S62 with the previous coefficients a, b, and c, and determines whether the coefficients a, b, and c satisfy prescribed convergence conditions. For example, if the current coefficients a, b, and c are identical to the previous coefficients a, b, and c, or if a difference between them is less than a threshold, the weight setting unit 142 determines that the coefficients a, b, and c satisfy the convergence conditions. In this connection, the weight setting unit 142 determines that the coefficients a, b, and c calculated for the first time do not satisfy the convergence conditions. If the convergence conditions are not satisfied, the procedure proceeds to step S64. Otherwise (if the coefficients a, b, and c sufficiently converge), the procedure proceeds to step S68.

(S64) The variance estimation unit 144 converts the coefficient c calculated at step S62 into an expected bias EB2. The coefficient c represents a limit on an improvement of prediction performance in the case where a machine learning algorithm $a_i$ is used, and corresponds to the expected bias EB2. The relationship between the coefficient c and the expected bias EB2 depends on an index of the prediction performance y. In the case where an accuracy index is used for the prediction performance y, the expected bias EB2 is expressed by EB2=1−c. In the case where an MSE index is used for the prediction performance y, the expected bias is expressed by EB2=c. In the case where an RMSE index is used for the prediction performance y, the expected bias is expressed by $EB2=c^2$.

However, while observed data includes few prediction performances $y_j$, the reliability of the coefficient c calculated through the nonlinear regression analysis is significantly low. To deal with this, the variance estimation unit 144 may calculate the expected bias EB2 in the following manner.

When a learning step for a sample size $x_1$ is executed, an expected value (training loss) of loss for extracted training data is directly obtained. In general, this training loss is not larger than the bias, and is therefore used as a lower limit of the bias. In view of this, the variance estimation unit 144 obtains a training loss measured for each sample size $x_j$. The variance estimation unit 144 compares the value obtained by converting the coefficient c as described above with the plurality of training losses, and takes the maximum value among the value obtained by converting the coefficient c and the plurality of training losses as the expected bias EB2. In this case, the step execution unit 132 outputs a training loss as well every time a single learning step is executed, to record the training loss in the management table 122a.

(S65) The variance estimation unit 144 converts the prediction performance $y_j$ for each sample size $x_j$ into an expected loss $EL_j$. The relationship between the measured prediction performance $y_j$ and the expected loss $EL_j$ depends on an index of the prediction performance y. If an accuracy index is used for the prediction performance y, the expected loss is expressed by $EL_j=1-y_j$. If an MSE index is used for the prediction performance y, the expected loss is expressed by $EL_j=y_j$. If an RMSE index is used for the prediction performance y, the expected loss is expressed by $EL_j=y_j^2$.

(S66) The variance estimation unit 144 calculates a variance $VL_j$ of prediction performance at each sample size $x_j$ using the expected bias EB2 obtained at step S64 and the expected loss $EL_j$ obtained at step S65. The variance $VL_A$ is calculated as $VL_j=(EL_j+EB2)\times(EL_j-EB2)$.

(S67) The weight setting unit 142 updates the weight $w_j$ for each $x_j$ to $1/VL_j$. Then, the procedure returns back to step S62 to carry out the nonlinear regression analysis again.

(S68) The estimation equation generation unit 141 generates an estimation equation (nonlinear equation of step S62) that includes the coefficients a, b, and c calculated last at step S62, as a function for estimating an expected value of prediction performance from a sample size. In addition, the estimation equation generation unit 141 generates a function for estimating a variance of prediction performance from a sample size. The variance of prediction performance at each sample size is calculated by the nonlinear regression unit 143 through the nonlinear regression analysis of step S62. For example, the variance is estimated together with the expected value by the use of statistical package software. The estimation equation generation unit 141 outputs the function for obtaining an expected value and the function for obtaining a variance.

The following describes an accuracy of estimating a variance of prediction performance according to a second embodiment.

Figure 18:
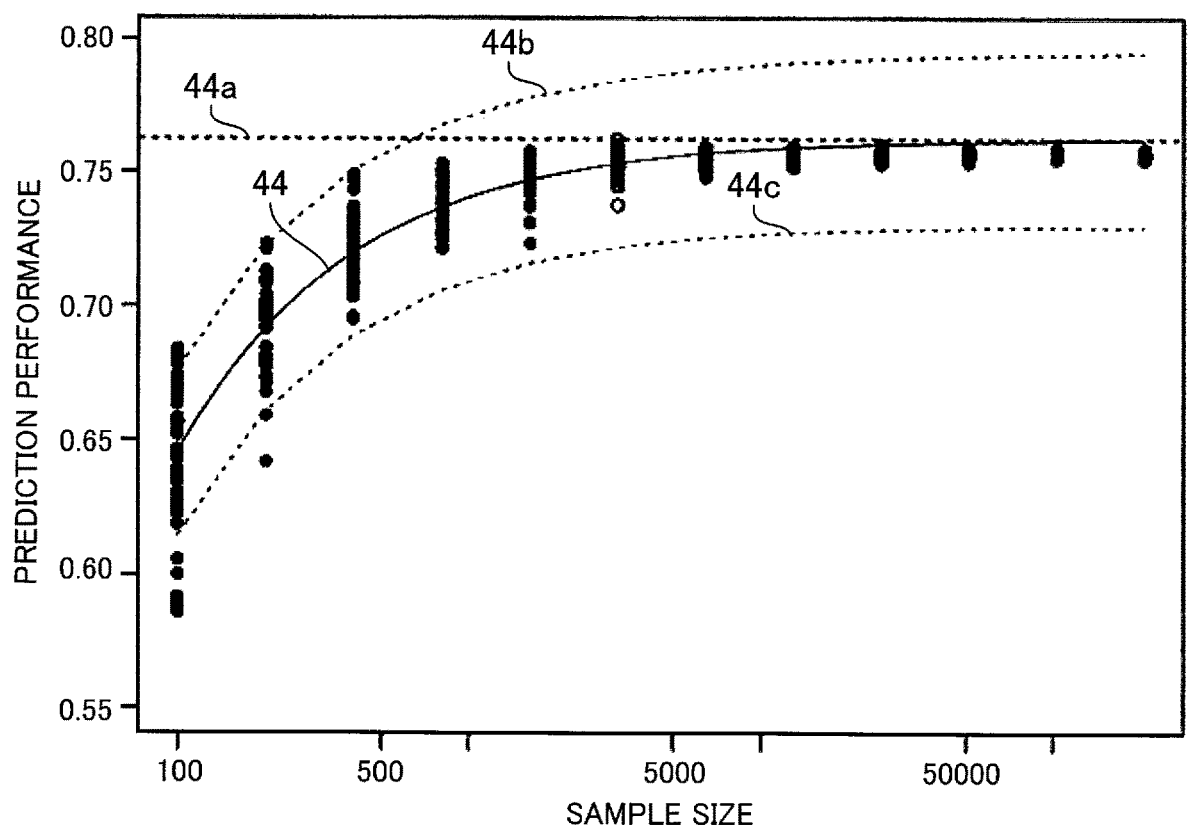
FIG. 18 is a graph representing a first example of estimating a distribution of prediction performance.

FIG. 18 is a graph representing a first example of estimating a distribution of prediction performance.

This graph represents a prediction performance curve estimated through a simple nonlinear regression analysis in accordance with the above-mentioned document "Prediction of Learning Curves in Machine Translation." The graph represents observed prediction performances at a plurality of sample sizes. Fifty observed prediction performances are plotted for each sample size. An accuracy index, in which a larger value indicates a higher prediction performance, is used for the prediction performance.

A curve 44 is a prediction performance curve that is estimated from some observed prediction performances and represents the relationship between sample size and expected value of prediction performance. A straight line 44a represents the upper limit of prediction performances estimated from the curve 44. A curve 44b represents the upper limit of a 95% confidence interval calculated through the regression analysis, and is an estimated upward distribution of prediction performances to be measured. A curve 44c represents the lower limit of the 95% confidence interval calculated through the regression analysis, and is an estimated downward distribution of prediction performances to be measured.

The following tendency is seen from the curves 44b and 44c: the estimated 95% confidence interval becomes smaller as the sample size decreases, and the estimated 95% confidence interval becomes larger as the sample size increases. This tendency is inconsistent with the distribution of actual plots in which the variance of prediction performance becomes higher as the sample size decreases, and the variance of prediction performance becomes lower as the sample size increases. Therefore, it is not right to say that the variance of prediction performance at each sample size is accurately evaluated in the estimation of the prediction performance curve.

Figure 19:
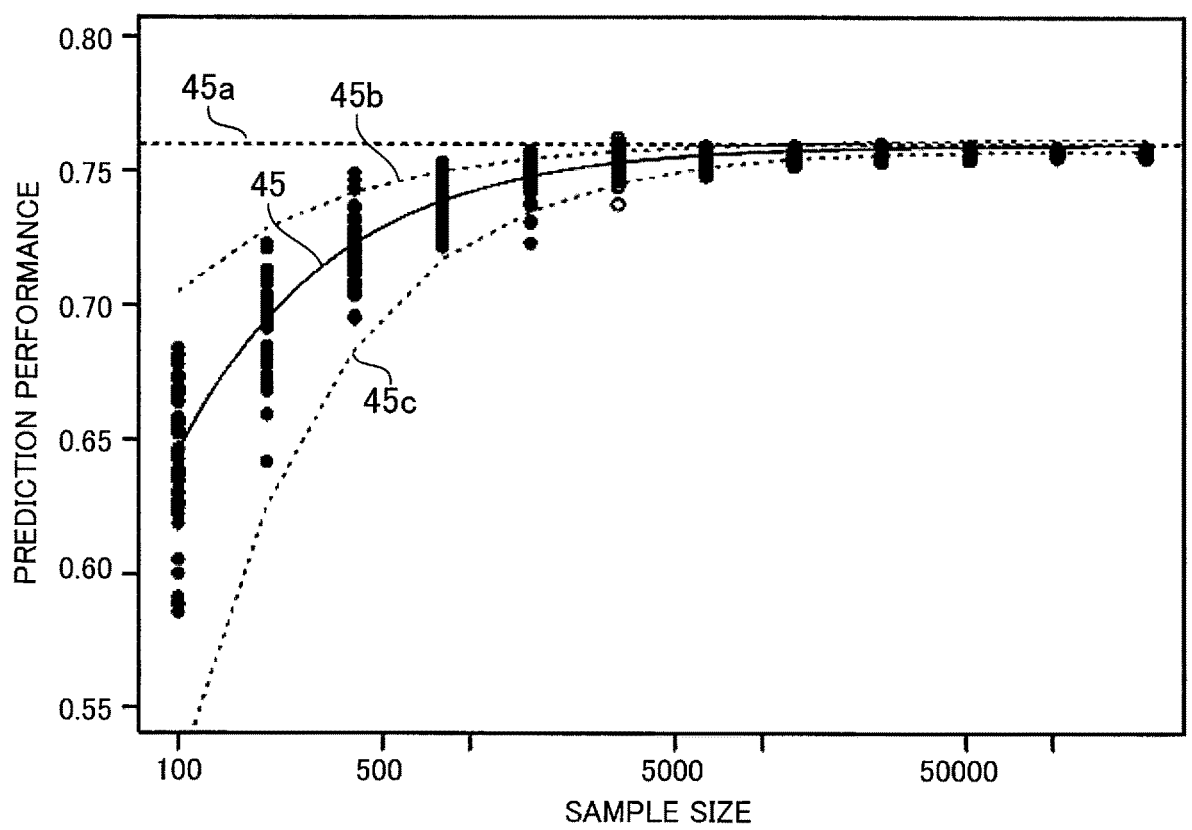
FIG. 19 is a graph representing a second example of estimating a distribution of prediction performance.

FIG. 19 is a graph representing a second example of estimating a distribution of prediction performance.

This graph represents a prediction performance curve estimated with a method different from that used in the second embodiment. The method employed here is to estimate a prediction performance curve, assuming that a variance of prediction performance at each sample size is proportional to the difference (gap) between expected value and upper limit of prediction performance at the sample size. This method may be considered as an estimation method simpler than that used in the second embodiment. Observed prediction performances at a plurality of sample sizes are plotted in the same way as in FIG. 18.

A curve 45 is a prediction performance curve representing the relationship between sample size and expected value of prediction performance. A straight line 45a represents the upper limit of prediction performances estimated from the curve 45. A curve 45b represents the upper limit of a 95% confidence interval calculated through a regression analysis. A curve 45c represents the lower limit of the 95% confidence interval calculated through the regression analysis.

The following tendency is seen from the curves 45b and 45c: the estimated 95% confidence interval becomes larger as the sample size decreases, and the estimated 95% confidence interval becomes smaller as the sample size increases. This tendency is consistent with the distribution of observed prediction performances. However, the width of the estimated 95% confidence interval does not always match the actual variance of prediction performance. The estimated 95% confidence interval is excessively larger than the actual variance at small sample size, and is excessively smaller than the actual variance at large sample size. Therefore, it is not right to say that the distribution of prediction performance at each sample size is accurately evaluated in the estimation of the prediction performance curve.

Figure 20:
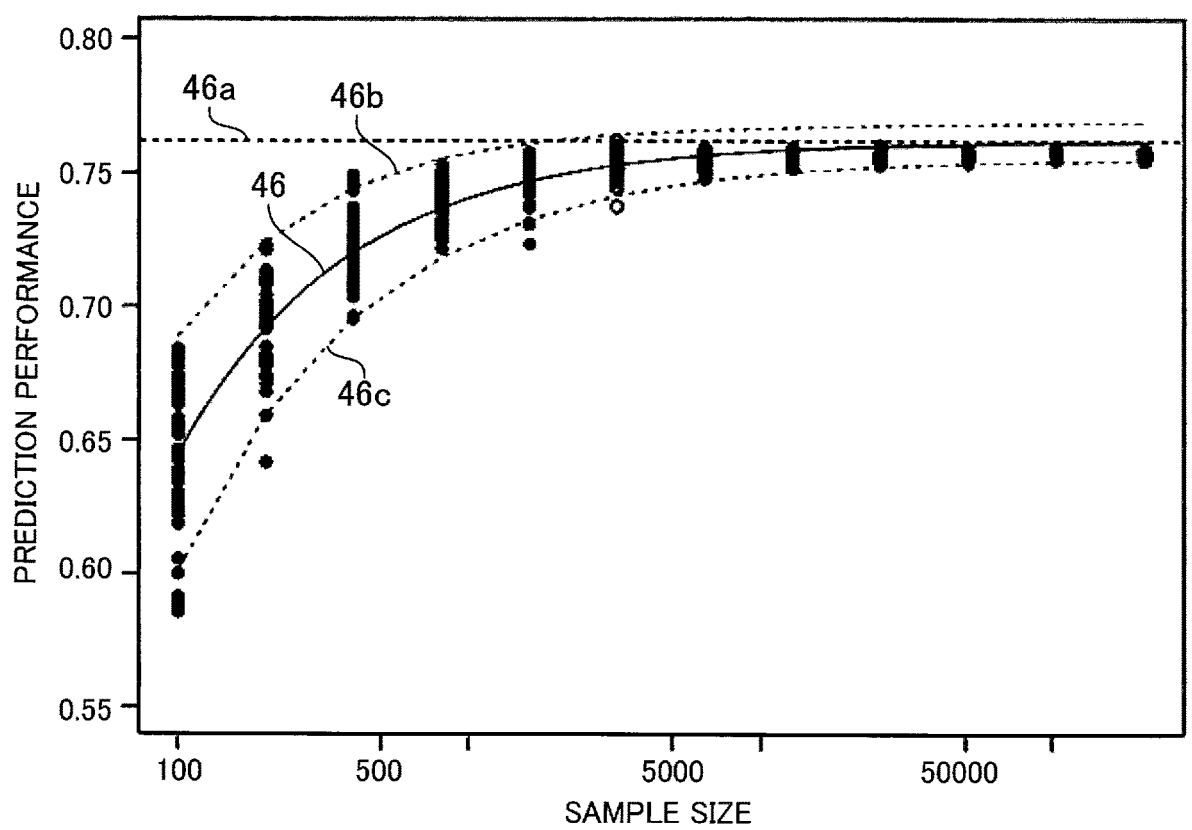
FIG. 20 is a graph representing a third example of estimating a distribution of prediction performance.

FIG. 20 is a graph representing a third example of estimating a distribution of prediction performance.

This graph represents a prediction performance curve estimated with the above-described method of the second embodiment. Observed prediction performances at a plurality of sample sizes are plotted in the same way as in FIGS. 18 and 19. A curve 46 is a prediction performance curve representing the relationship between sample size and expected value of prediction performance. A straight line 46a represents the upper limit of prediction performances estimated from the curve 46. A curve 46b represents the upper limit of a 95% confidence interval calculated through a regression analysis. A curve 46c represents the lower limit of the 95% confidence interval calculated through the regression analysis.

The following tendency is seen from the curves 46b and 46c: the estimated 95% confidence interval becomes larger as the sample size decreases, and the estimated 95% confidence interval becomes smaller as the sample size increases. This tendency is consistent with the distribution of observed prediction performances. In addition, the width of the estimated 95% confidence interval sufficiently matches the actual variance of prediction performance in terms of both small sample size and large sample size. That is to say, the accuracy of the 95% confidence interval is higher than that of FIG. 19. Therefore, it is right to say that the variance of prediction performance at each sample size is accurately evaluated in the estimation of the prediction performance curve. Since the variance of prediction performance is accurately evaluated, the accuracy of estimating a prediction performance curve is improved. Accordingly, it is possible to compare the prediction performance among a plurality of machine learning algorithms accurately.

The following describes mathematical grounds of mathematical expressions for calculating a variance of prediction performance.

(a) Formal Description of Problem

It is assumed that m pieces of training data $D_1, D_2, \ldots D_m$ and test data T are extracted from the same population. A model learned from the training data $D_k$ by a certain machine learning algorithm is taken as $f_k$ (k is an integer from one to m). The test data T is taken as a set of instances $<Y_i, X_i>$ (i is an integer from one to n). $X_i$ is a value (input value) of an explanatory variable, whereas $Y_i$ is a known value (true value) of a response variable corresponding to the input value $X_i$. A value (predicted value) predicted by the model $f_k$ from the input value $X_i$ is taken as $y_{ik}=f_k(X_i)$. A prediction error of the model $f_k$ for the input value $X_i$ is defined as $e_{ik}=Y_i-y_{ik}$. The number of instances included in the test data T, that is, the size of the test data T is n. In the following, the suffixes i and j are used as variables identifying instances of the test data T, and the suffix k is used as a variable identifying a model.

In the case where a machine learning algorithm is used for regression, a predicted value is a continuous quantity, and a squared loss expressed by the expression (1) is often used as an index of loss. The average of squared losses across all instances of the test data T is MSE expressed by the expression (2).

$$\mathrm{loss}_{sq}(e)=e^2 \quad (1)$$

$$\mathrm{MSE}=E_X[\mathrm{loss}_{sq}(e_{ik})]=E_X[e_{ik}^2] \quad (2)$$

E[•] is an operator for obtaining an expected value, and V[•] is an operator for obtaining a variance. A suffix X added to E[•] and V[•] indicates that this operator is an operation over the plurality of instances included in the test data T. A suffix M added to E[•] and V[•] indicates that this operator is an operation over a plurality of models. That is, $E_X[•]$ indicates an expected value that is an average value across the plurality of instances included in the test data T, and $E_M[•]$ indicates an expected value that is an average value across the plurality of models. $V_X[•]$ indicates a variance across the plurality of instances included in the test data T, and $V_M[•]$ indicates a variance across the plurality of models. In addition, cov(•,•) is a covariance function for obtaining a covariance, and cor(•,•) is a correlation coefficient function for obtaining a correlation coefficient. The suffixes X and M are also added to both cov(•,•) and cor(•,•).

In the case where a machine learning algorithm is used for binary classification, a predicted value is a binary discrete value, like $\{-1,-1\}$, and the 0-1 loss defined by the expression (3) is often used as an index of loss. A result obtained by calculating the average value of 0-1 losses across all instances included in the test data T and subtracting the average value from one is the accuracy expressed by the expression (4).

$$\mathrm{loss}_{01}(e) = \begin{cases} 0 & \text{if } e = 0 \\ 1 & \text{otherwise} \end{cases} \quad (3)$$

$$\mathrm{Accuracy} = 1 - E_X[\mathrm{loss}_{01}(e_{ik})] = 1 - E_X[e_{ik}^2] \quad (4)$$

A smaller MSE value indicates a higher prediction performance, whereas a higher accuracy value indicates a higher prediction performance. However, these have a common feature that an average loss across the whole test data T represents the quality of the prediction performance of a model, and may be called a model loss. The model loss $ML_k$ of a model $f_k$ is represented by the expression (5). A variance of prediction performance is represented as a variance of model loss across a plurality of models, as represented by the expression (6).

$$ML_k=E_X[e_{ik}^2] \quad (5)$$

$$V_M[E_X[e_{ik}^2]]=V_M[ML_k] \quad (6)$$

(b) Bias-Variance Decomposition

Loss caused in prediction made by a model is decomposed into bias and variance. The bias indicates how much a predicted value made by the model deviates. A model with a lower bias is considered to be more accurate. A model with low expression ability (i.e., a model with low complexity that includes a few adjustable coefficients) tends to have a higher bias. The variance indicates how much predicted values made by the model vary. A model with a lower variance is considered to be more accurate. A model with high expression ability (i.e., a model with high complexity that includes many adjustable coefficients) tends to have a higher variance. The model with high expression ability has a risk of overfitting in which the model too closely matches training data.

The loss $L_i$, bias $B_i$, and variance $V_i$ with respect to an input value $X_i$ of the test data T are defined as expressions (7) to (9). The loss $L_i$ is an expected value of squared error across a plurality of models, the bias $B_i$ is an expected value of error across the plurality of models, and the variance $V_i$ is a variance of error across the plurality of models. The loss $L_i$, bias $B_i$, and variance $V_i$ satisfy the relationship (bias-variance decomposition) represented by the expression (10).

$$L_i=E_M[e_{ik}^2] \quad (7)$$

$$B_i=E_M[e_{ik}] \quad (8)$$

$$V_i=V_M[e_{ik}] \quad (9)$$

$$L_i=V_i+B_i^2 \quad (10)$$

With respect to various input values $X_i$, an expected value of the loss $L_i$ is taken as an expected loss EL, an expected value of the square of the bias $B_i$ is taken as an expected EB2, and an expected value of the variance $V_i$ is taken as an expected variance EV. The expected loss EL, expected bias EB2, and expected variance EV are defined as the expressions (11) to (13). The expected loss EL, expected bias EB2, and expected variance EV satisfy the relationship (bias-variance decomposition) represented by the expression (14).

$$EL = E_X[L_i] \tag{11}$$

$$EB2 = E_X[B_i^2] \tag{12}$$

$$EV = E_X[V_i] \tag{13}$$

$$EL = EV + EB2 \tag{14}$$

An objective here is to derive the relationship among EL, EB2, EV, and a variance of model loss. Note that the expected loss EL and an expected value of the model loss $ML_k$ are equivalent to each other, as expressed by the expression (15). However, the variance of the loss $L_i$ and the variance of the model loss $ML_k$ are not equivalent to each other. A mathematical expression for estimating a variance of prediction performance is derived in the following manner. First, a variance of instance loss is described by using a bias and a variance. Second, a variance of model loss is decomposed into an instance component and an interaction component. Third, the instance component is calculated. Forth, the interaction component is calculated. Fifth, the variance of model loss is described by using the bias and the variance.

$$EL = E_X[L_i] = E_X[E_M[e_{ik}^2]] = E_M[E_X[e_{ik}^2]] = E_M[ML_k] \tag{15}$$

(c) Description of Variance of Loss by Using Bias and Variance

An error vector in which errors of a plurality of models obtained from the same input value $X_i$ of the test data T are arranged will be considered. Assuming that an error e is a random variable and a distribution of the error e is a normal distribution, the variance of loss across the plurality of models is defined as the expression (16) and is described by using a combination of bias $B_i$ and variance $V_i$ or a combination of loss $L_i$ and bias $B_i$. In the expression (16), the first line is transformed into the second line, using the statistical nature (an expected value of the fourth power of the random variable) represented by the expression (17). In the expression (17), X is a random variable, S is a skewness, and K is a kurtosis. In the case of the normal distribution, S is zero and K is 3.

$$V_M[e_{ik}^2] = E_M[e_{ik}^4] - (E_M[e_{ik}^2])^2 \tag{16}$$
$$= 2V_i^2 + 4V_i B_i^2$$
$$= 2L_i^2 - 2B_i^4$$

$$E[X^4] = K(V[X])^2 + 4S(V[X])^{1.5}E[X] + 6V[X](E[X])^2 + (E[X])^4 \tag{17}$$

(d) Decomposition of Variance of Model Loss into Instance Component and Interaction Component From the basic nature of a variance, a variance of prediction performance (a variance of model loss across a plurality of models) satisfies the expression (18). Considering this as the average of the components of a n×n matrix, the diagonal components (i=j) represent a variance of loss for the input value $X_i$, and a correlation coefficient for the diagonal components becomes one. A correlation coefficient for the off-diagonal components (i≠j) represents a correlation of loss among different input values. The occurrence conditions of errors for the different input values do not have many things in common, and therefore, the correlation coefficient is usually sufficiently small. The correlation coefficient in connection with a model with higher prediction performance is closer to zero. Since the diagonal components and the off-diagonal components have different natures, they are separately considered, as indicated in the expression (19).

$$V_M[E_X[e_{ik}^2]] = E_{Xi}[E_{Xj}[\text{cov}_M(e_{ik}^2, e_{jk}^2)]] \tag{18}$$
$$= E_{Xi}[E_{Xj}[\text{cor}_M(e_{ik}^2, e_{jk}^2) \cdot (V_M[e_{ik}^2])^{0.5}(V_M[e_{jk}^2])^{0.5}]]$$

$$E_{Xi}[E_{Xj}[\text{cov}_M(e_{ik}^2, e_{jk}^2)]] = \tag{19}$$
$$\frac{n}{n^2} E_{Xi}[E_{Xj,j=i}[\text{cov}_M(e_{ik}^2, e_{jk}^2)]] + \frac{n(n-1)}{n^2} E_{Xi}[E_{Xj,j\neq i}[\text{cov}_M(e_{ik}^2, e_{jk}^2)]] =$$
$$\frac{1}{n} E_X[V_M[e_{ik}^2]] + \frac{n-1}{n} E_{Xi}[E_{Xj,j\neq i}[\text{cov}_M(e_{ik}^2, e_{jk}^2)]]$$

In the expression (19), the variance of model loss is decomposed into the first term of instance component and the second term of interaction component. The first term represents an expected value of the variance of instance loss, and usually accounts for a large part of the variance of model loss. The second term represents an expected value of covariance across the different input values, and usually contributes only a little to the variance of model loss. Since the first term is inversely proportional to the size n of the test data T, the variance of model loss is reduced by increasing the number of instances in the test data T. However, effects produced by the reduction are limited because of the existence of the second term.

(e) Calculation of Instance Component

The first term of the expression (19) will be considered. The expression (20) is satisfied from the above expression (16). Some assumptions are made for calculating the first and second terms of the expression (20). Since many machine learning algorithms learn models such as to output unbiased estimators, it is assumed that an expected value of error is zero, as indicated in the expression (21). The nature expressed by the expression (22) is derived for the bias $B_i$ from the expression (21).

$$E_X[V_M[e_{ik}^1]] = 2E_X[L_i^2] - 2E_X[B_i^4] \tag{20}$$

$$E_X[e_{ik}] = 0 \tag{21}$$

$$E_X[B_i] = 0 \tag{22}$$

In addition, it is assumed that, in a probability distribution, an expected value and a variance may vary with the sample size of training data and a sampling method, but the skewness and kurtosis, which indicate the shape of the probability distribution, do not vary (or vary very gently). More specifically, it is assumed that a distribution of error across a plurality of models for the input value $X_i$ forms a normal distribution, the kurtosis is three, and the skewness is zero. It is also assumed that the kurtosis K1 of the distribution of the bias $B_i$ does not vary. The kurtosis K1 of the distribution of the bias $B_i$ is defined as the expression (23). The expression (24) is derived from the expression (23) and the above expression (12).

$$K1 = \frac{E_X[B_i^4]}{(E_X[B_i^2])^2} \quad (23)$$

$$E_X[B_i^4] = K1 \cdot EB2^2 \quad (24)$$

Further, it is assumed that the kurtosis K2 of the distribution of error across a plurality of input values for a model $f_k$ is common to the models and does not vary. The kurtosis K2 is defined as the expression (25). The K1 and K2 values usually range from three to ten and are close to each other.

$$K2 = \frac{E_M[E_X[e_{ik}^4]]}{E_M[(E_X[e_{ik}^2])^2]} \quad (25)$$

The expression (26) is derived from the expression (25). The expression (27) is derived by substituting the expression (26) into the expressions (18) and (19). The kurtosis K2 is sufficiently smaller than the size n, and therefore 1−K2/n is approximated to one. The expression (28) is derived by substituting the expressions (20) and (23) into the expressions (18) and (19). The expression (29) is derived by subtracting the expression (27) from the expression (28). Then, the expression (30) is derived from the expressions (20), (24), and (29). This is the main component in the first term of the expression (19).

$$E_X[V_M[e_{ik}^2]] = E_X[E_M[e_{ik}^4]] - E_X[(E_M[e_{ik}^2])^2] \quad (26)$$
$$= K2 \cdot E_M[(E_X[e_{ik}^2])^2] - K2(E_M[E_X[e_{ik}^2]])^2 +$$
$$K2(E_M[E_X[e_{ik}^2]])^2 - E_X[(E_M[e_{ik}^2])^2]$$
$$= K2 \cdot V_M[E_X[e_{ik}^2]] + K2 \cdot EL^2 - E_X[L_i^2]$$

$$\left(1 - \frac{K2}{n}\right) V_M[E_X[e_{ik}^2]] \approx V_M[E_X[e_{ik}^2]] = \quad (27)$$
$$\frac{1}{n}(K2 \cdot EL^2 - E_X[L_i^2]) + \frac{n-1}{n} E_{Xi}[E_{Xj,j\neq i}[\text{cov}_M(e_{ik}^2, e_{jk}^2)]]$$

$$V_M[E_X[e_{ik}^2]] = \quad (28)$$
$$\frac{1}{n}(2E_X[L_i^2] - 2K1 \cdot EB2^2) + \frac{n-1}{n} E_{Xi}[E_{Xj,j\neq i}[\text{cov}_M(e_{ik}^2, e_{jk}^2)]]$$

$$E_X[L_i^2] = \frac{1}{3} K2 \cdot EL^2 + \frac{2}{3} K1 \cdot EB2^2 \quad (29)$$

$$E_X[V_M[e_{ik}^2]] = \frac{2}{3} K2 \cdot EL^2 - \frac{2}{3} K1 \cdot EB2^2 \quad (30)$$

(f) Calculation of Interaction Component

A fixed point Cor1v is defined as the expression (31). It is assumed that the fixed point Cor1v does not depend on the sample size of training data because the value of the fixed point Cor1v usually does not vary or varies very gently with the sample size. The value of the fixed point Cor1v is usually approximately 0.001 to 0.1.

$$\text{Cor1v} = V_{i,j,j\neq i}[\text{cor}_M(e_{ik}, e_{jk})] \quad (31)$$
$$= E_{Xi}[E_{Xj,j\neq i}[\text{cor}_M(e_{ik}, e_{jk})^2]] - (E_{Xi}[E_{Xj,j\neq i}[\text{cor}_M(e_{ik}, e_{jk})]])^2$$

Now, the statistical nature (i.e., an expected value of correlation coefficient of error) expressed by the expression (32) is used. When an expected value of error is zero, an expected value of correlation coefficient between two errors is approximated to zero. From this nature, the expression (33) is satisfied, and the expression (34) is derived from the above expression (31).

$$E_X[e_{ik}] = 0 \Rightarrow E_{Xi}[E_{Xj}[\text{cor}_M(e_{ik}, e_{jk})]] \approx 0 \quad (32)$$

$$E_{Xi}[E_{Xj,j\neq i}[\text{cor}_M(e_{ik}, e_{jk})]] = \frac{n^2 E_{Xi}[E_{Xj}[\text{cor}_M(e_{ik}, e_{jk})]] - n}{n(n-1)} \approx \frac{-1}{n-1} \quad (33)$$

$$E_{Xi}[E_{Xj,j\neq i}[\text{cor}_M(e_{ik}, e_{jk})^2]] \approx \text{Cor1v} + \frac{1}{(n-1)^2} \quad (34)$$

In addition, the expression (35) is satisfied. In the expression (35), the second line is transformed to the third line, assuming that the correlation coefficient $\text{cor}_M$ and the variances $V_i$ and $V_j$ are independent of one another. In the expression (35), the third line is transformed to the fourth line, using the above expression (34) and the fact that an expected value of $V_i \cdot V_j$ is approximated to $EV^2$. In the approximation of the fourth line in the expression (35), $1/(n-1)^2$ is ignored because the size n is sufficiently larger than one.

$$E_{Xi}[E_{Xj,j\neq i}[\text{cov}_M(e_{ik}, e_{jk})^2]] = E_{Xi}[E_{Xj,j\neq i}[\text{cor}_M(e_{ik}, e_{jk})^2 V_i \cdot V_j]] = \quad (35)$$
$$E_{Xi}[E_{Xj,j\neq i}[\text{cor}_M(e_{ik}, e_{jk})^2]] \cdot E_{Xi}[E_{Xj,j\neq i}[V_i \cdot V_j]] \approx$$
$$\left(\text{Cor1v} + \frac{1}{(n-1)^2}\right) EV^2 \approx \text{Cor1v} \cdot EV^2 \approx \text{Cor1v}(EL - EB2)^2$$

Now, the statistical nature (i.e., the relationship between square of covariance and squared covariance) expressed by the expression (36) is used. If a joint probability of random variables X and Y follows a two-dimensional normal distribution, the expression (36) is satisfied. Since the variance of error follows a normal distribution because of the above assumptions, the expression (37) is derived from the expression (36). In addition, the expression (38) is satisfied. In the expression (38), the first line is transformed to the second line, assuming that the covariance $\text{cov}_M$ and the biases $B_i$ and $B_j$ are roughly independent of one another. In the approximation of the second line in the expression (38), the following nature is used: an expected value of $B_i B_j$ is approximated to the square of an expected value of the bias $B_i$ and thus is approximated to zero. The expression (39) is derived by substituting the expressions (35) and (38) into the expression (37). This is a main component in the second term of the expression (19).

$$\text{cov}(X^2, Y^2) = 2\text{cov}(X, Y)^2 + 4E[X]E[Y]\text{cov}(X, Y) \quad (36)$$

$$E_{Xi}[E_{Xj,j\neq i}[\text{cov}_M(e_{ik}^2, e_{jk}^2)]] = \quad (37)$$
$$E_{Xi}[E_{Xj,j\neq i}[2\text{cov}_M(e_{ik}, e_{jk})^2]] + E_{Xi}[E_{Xj,j\neq i}[4B_i B_j \text{cov}_M(e_{ik}, e_{jk})]]$$

$$E_{Xi}[E_{Xj,j\neq i}[B_i B_j \text{cov}_M(e_{ik}, e_{jk})]] = \quad (38)$$
$$E_{Xi}[E_{Xj,j\neq i}[\text{cov}_M(e_{ik}, e_{jk})]] \cdot E_{Xi}[E_{Xj,j\neq i}[B_i B_j]] \approx 0$$

$$E_{Xi}[E_{Xj,j\neq i}[\text{cov}_M(e_{ik}^2, e_{jk}^2)]] \approx 2\text{Cor1v}(EL - EB2)^2 \quad (39)$$

(g) Description of Variance of Model Loss by Using Bias and Variance

An approximate expression (40) is satisfied from the above expressions (18), (19), (30), and (39). The kurtosis K2 is approximated to the kurtosis K1, and therefore the expression (40) is approximated to the expression (41). Normally, K1(EL+EB2) is sufficiently larger than corlv(EL−EB2), and therefore the expression (41) is further approximated to the expression (42). The kurtosis K1 is unknown beforehand, but its specific value is not needed in the second embodiment. Therefore, the expression (42) is simplified as the expression (43) using a proportionality constant C. Thereby, the mathematical expression is derived in which the variance of prediction performance is proportional to the difference between the expected loss EL and the expected bias EB2 and is also proportional to the sum of the expected loss EL and the expected bias EB2.

$$V_M[E_X[e_{ik}^2]] \approx \tag{40}$$

$$\frac{1}{n}\left(\frac{2}{3}K2 \cdot EL^2 - \frac{2}{3}K1 \cdot EB2^2\right) + \frac{n-1}{n} \cdot 2Corlv(EL - EB2)^2$$

$$V_M[E_X[e_{ik}^2]] \approx \tag{41}$$

$$\left(\frac{1}{n}\frac{2}{3}K1(EL + EB2) + \frac{n-1}{n} \cdot 2Corlv(EL - EB2)\right)(EL - EB2)$$

$$V_M[E_X[e_{ik}^2]] \approx \frac{1}{n}\frac{2}{3}K1(EL + EB2)(EL - EB2) \tag{42}$$

$$V_M[E_X[e_{ik}^2]] \approx C(EL - EB2)(EL + EB2) \tag{43}$$

$$\approx C \cdot EV(EV + 2EB2)$$

The machine learning apparatus 100 of the second embodiment estimates an improvement amount (improvement rate) of prediction performance per unit time, which is to be obtained when the next learning step is executed with the next larger sample size, with respect to each machine learning algorithm. Then, the machine learning apparatus 100 selects a machine learning algorithm with a currently highest improvement rate, and executes the next learning step according to the selected machine learning algorithm. The machine learning apparatus 100 repeatedly estimates the improvement rates and selects a machine learning algorithm, so as to finally output a model with the highest prediction performance.

Thereby, it is possible to avoid executing learning steps that do not contribute to the improvement in prediction performance and to thereby reduce the overall learning time. In addition, a machine learning algorithm with the currently highest estimated improvement rate is selected. Therefore, even if the learning time is limited and the machine learning is stopped midway, a model obtained by the end time will be the best model obtained within the time limit. In addition, a learning step that contributes even just a little to the improvement in the prediction performance has a chance of being executed even if its execution may be deferred. This reduces the risk of eliminating a machine learning algorithm that would produce a high upper limit of prediction performance while the sample size is small. Thus, it is possible to efficiently improve the prediction performance of a model using a plurality of machine learning algorithms.

In addition, to estimate the prediction performance to be achieved in the next learning step, a prediction performance curve is estimated through a nonlinear regression analysis on the basis of observed data including combinations of a sample size and an observed prediction performance. At this time, to compensate for heteroscedasticity in which a variance of errors included in the observed prediction performances varies with the sample size, a different weight is given according to the sample size. The weight for a certain sample size is set such as to be inversely proportional to an estimated variance at the sample size. The variance at a certain sample size is estimated with the prescribed calculation expressions indicating the relationship among variance, expected loss, and expected bias, by applying the concept of the bias-variance decomposition. Thereby, it is possible to improve the accuracy of the nonlinear regression analysis, to estimate a highly-reliable prediction performance curve from observed values including errors, and to estimate an expected value and variance of prediction performance at an unprocessed simple size.

In addition, since the accuracy of estimating the prediction performance is improved, it is possible to reduce the risk of erroneously selecting a machine learning algorithm with a low upper limit of prediction performance, and to reduce the overall learning time. In addition, it is possible to determine, at an early stage, whether the prediction performance of each machine learning algorithm has approached an upper limit sufficiently, and therefore to determine to stop executing the learning steps at appropriate timing.

According to one aspect, it is possible to improve the accuracy of comparing prediction performance among a plurality of machine learning algorithms.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program that causes a computer to perform a process comprising:

building a plurality of learning models using training data of a plurality of first sample sizes according to a first machine learning algorithm and calculating a plurality of measured prediction performances, the training data being extracted from an identical data population, the plurality of measured prediction performances respectively indicating results of measuring prediction performance of the plurality of learning models;

calculating a plurality of estimated expected losses and an estimated expected bias, based on the plurality of measured prediction performances, and calculating a plurality of estimated variances using the plurality of estimated expected losses and the estimated expected bias, based on relationship information, the plurality of estimated variances respectively indicating results of estimating variances of the prediction performance at the plurality of first sample sizes, the relationship information indicating relationship among expected loss indicating an expected value of an error rate in prediction, expected bias indicating a lower limit of the expected loss, and variance of the prediction performance, the plurality of estimated expected losses respectively indicating results of estimating expected losses with respect to the plurality of first sample sizes, the estimated expected bias indicating a result of estimating the expected bias;

creating a first prediction performance curve through a regression analysis using the plurality of measured prediction performances and the plurality of estimated variances, the first prediction performance curve representing relationship between sample size and the prediction performance and being a curve in which the prediction performance approaches a fixed upper limit of the prediction performance;

calculating a first evaluation value of the first machine learning algorithm, based on the first prediction performance curve and a second sample size; and comparing the first evaluation value with a second evaluation value of a second machine learning algorithm, the second evaluation value being calculated based on a second prediction performance curve corresponding to the second machine learning algorithm and the second sample size.

2. The non-transitory computer-readable storage medium according to claim 1, wherein the relationship information indicates that the variance of the prediction performance is proportional to a sum of the expected loss and the expected bias and is proportional to a difference between the expected loss and the expected bias.

3. The non-transitory computer-readable storage medium according to claim 1, wherein the creating of the first prediction performance curve includes assigning a plurality of weights to the plurality of measured prediction performances according to the plurality of estimated variances in such a way that a weight to be assigned is increased as an estimated variance decreases, and carrying out the regression analysis using the plurality of measured prediction performances and the plurality of weights.

4. A comparison method comprising:

building, by a processor, a plurality of learning models using training data of a plurality of first sample sizes according to a first machine learning algorithm and calculating a plurality of measured prediction performances, the training data being extracted from an identical data population, the plurality of measured prediction performances respectively indicating results of measuring prediction performance of the plurality of learning models;

calculating, by the processor, a plurality of estimated expected losses and an estimated expected bias, based on the plurality of measured prediction performances, and calculating a plurality of estimated variances using the plurality of estimated expected losses and the estimated expected bias, based on relationship information, the plurality of estimated variances respectively indicating results of estimating variances of the prediction performance at the plurality of first sample sizes, the relationship information indicating relationship among expected loss indicating an expected value of an error rate in prediction, expected bias indicating a lower limit of the expected loss, and variance of the prediction performance, the plurality of estimated expected losses respectively indicating results of estimating expected losses with respect to the plurality of first sample sizes, the estimated expected bias indicating a result of estimating the expected bias;

creating, by the processor, a first prediction performance curve through a regression analysis using the plurality of measured prediction performances and the plurality of estimated variances, the first prediction performance curve representing relationship between sample size and the prediction performance and being a curve in which the prediction performance approaches a fixed upper limit of the prediction performance;

calculating, by the processor, a first evaluation value of the first machine learning algorithm, based on the first prediction performance curve and a second sample size; and comparing, by the processor, the first evaluation value with a second evaluation value of a second machine learning algorithm, the second evaluation value being calculated based on a second prediction performance curve corresponding to the second machine learning algorithm and the second sample size.

5. A comparison apparatus comprising:

a memory configured to store therein a plurality of measured prediction performances and relationship information, the plurality of measured prediction performances respectively indicating results of measuring prediction performance of a plurality of learning models, the plurality of learning models being built using training data of a plurality of first sample sizes according to a first machine learning algorithm, the training data being extracted from an identical data population, the relationship information indicating relationship among expected loss indicating an expected value of an error rate in prediction, expected bias indicating a lower limit of the expected loss, and variance of the prediction performance; and a processor configured to perform a process including calculating a plurality of estimated expected losses and an estimated expected bias, based on the plurality of measured prediction performances, and calculating a plurality of estimated variances using the plurality of estimated expected losses and the estimated expected bias, based on the relationship information, the plurality of estimated variances respectively indicating results of estimating variances of the prediction performance at the plurality of first sample sizes, the plurality of estimated expected losses respectively indicating results of estimating expected losses with respect to the plurality of first sample sizes, the estimated expected bias indicating a result of estimating the expected bias, creating a first prediction performance curve through a regression analysis using the plurality of measured prediction performances and the plurality of estimated variances, the first prediction performance curve representing relationship between sample size and the prediction performance and being a curve in which the prediction performance approaches a fixed upper limit of the prediction performance, calculating a first evaluation value of the first machine learning algorithm, based on the first prediction performance curve and a second sample size, and comparing the first evaluation value with a second evaluation value of a second machine learning algorithm, the second evaluation value being calculated based on a second prediction performance curve corresponding to the second machine learning algorithm and the second sample size.

* * * * *